June 27, 1944.  W. R. DRAY  2,352,257
HARVESTER-THRESHER COMBINE
Filed Dec. 29, 1939  13 Sheets-Sheet 1
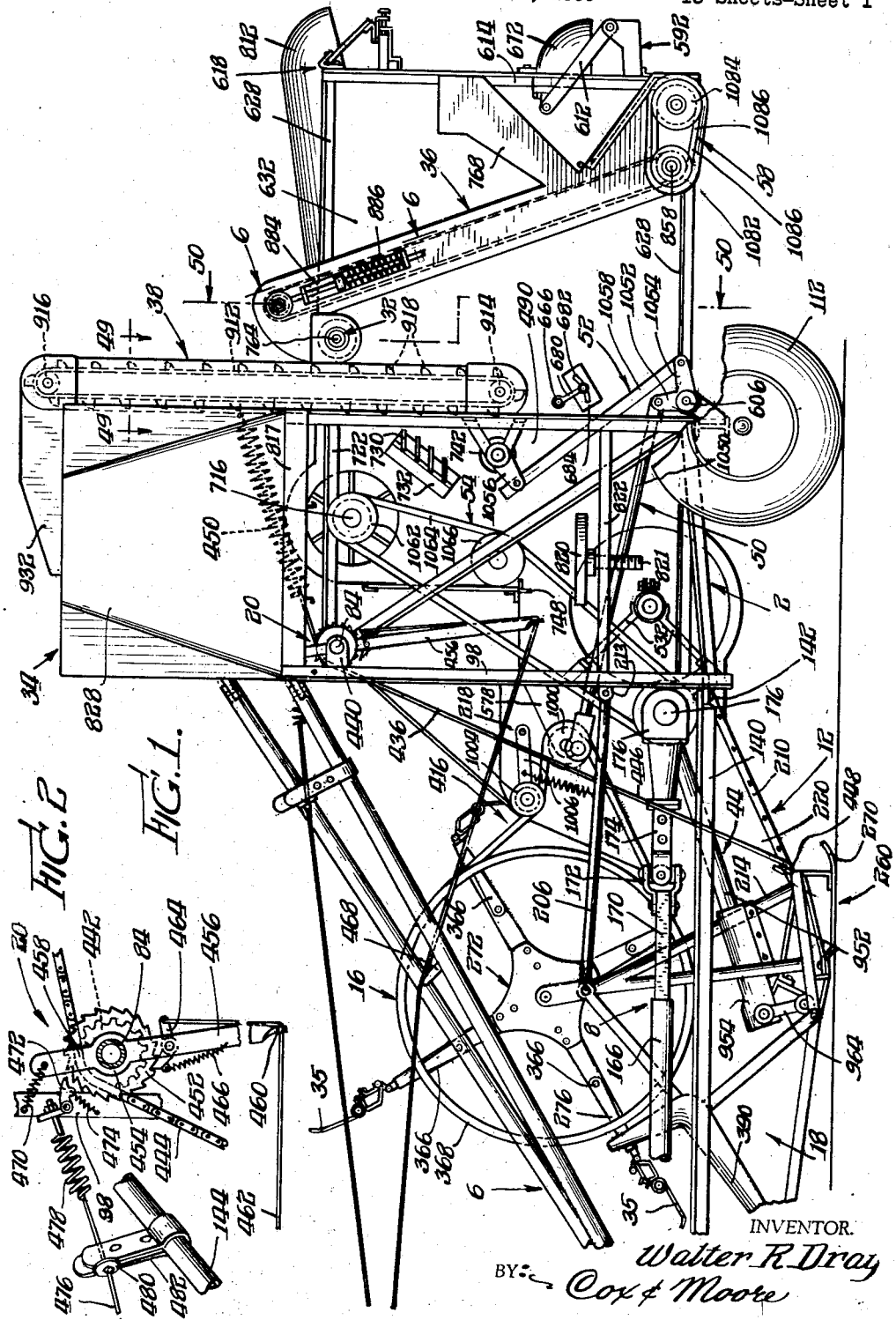
INVENTOR.
Walter R. Dray
BY Cox & Moore
ATTORNEYS

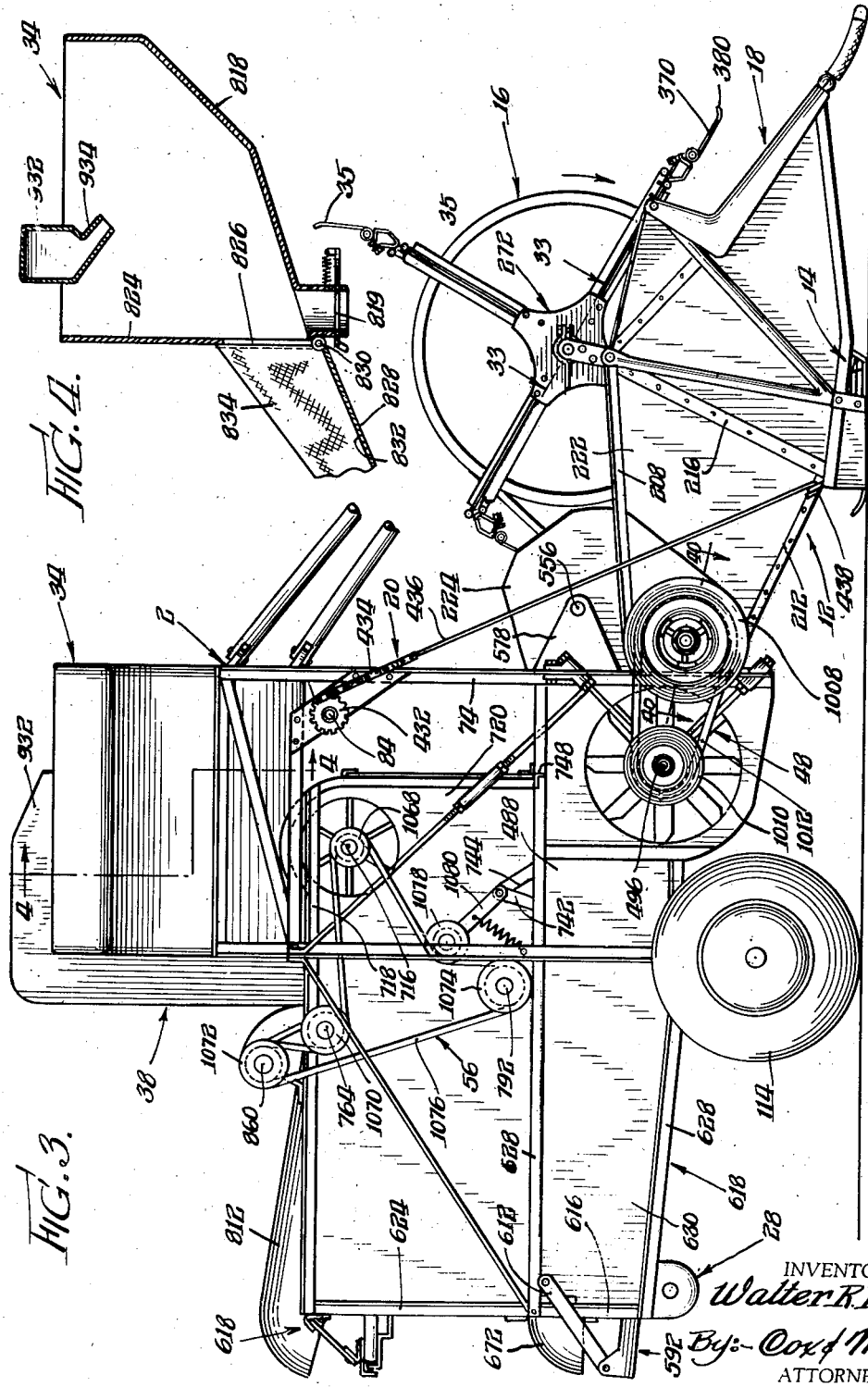

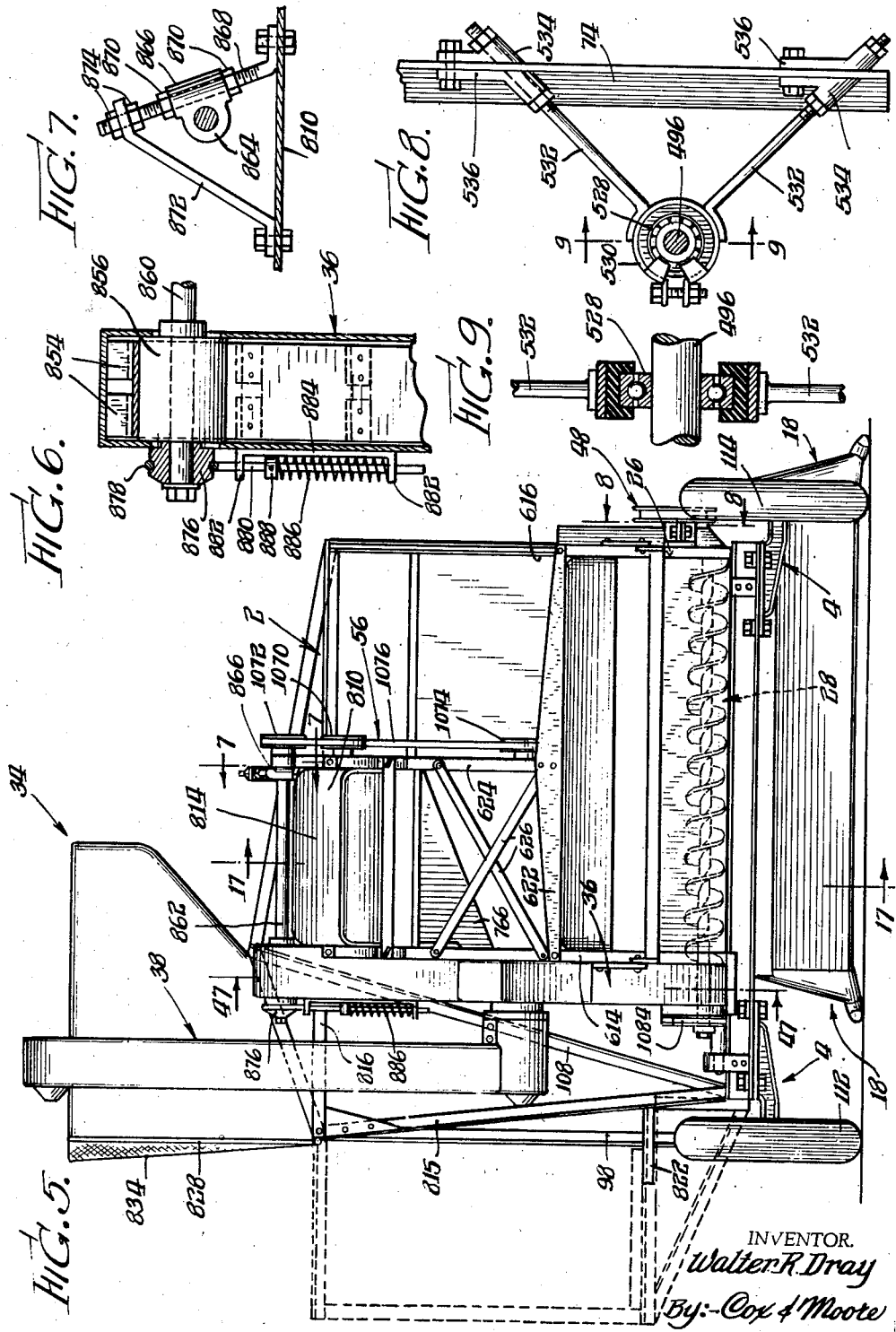

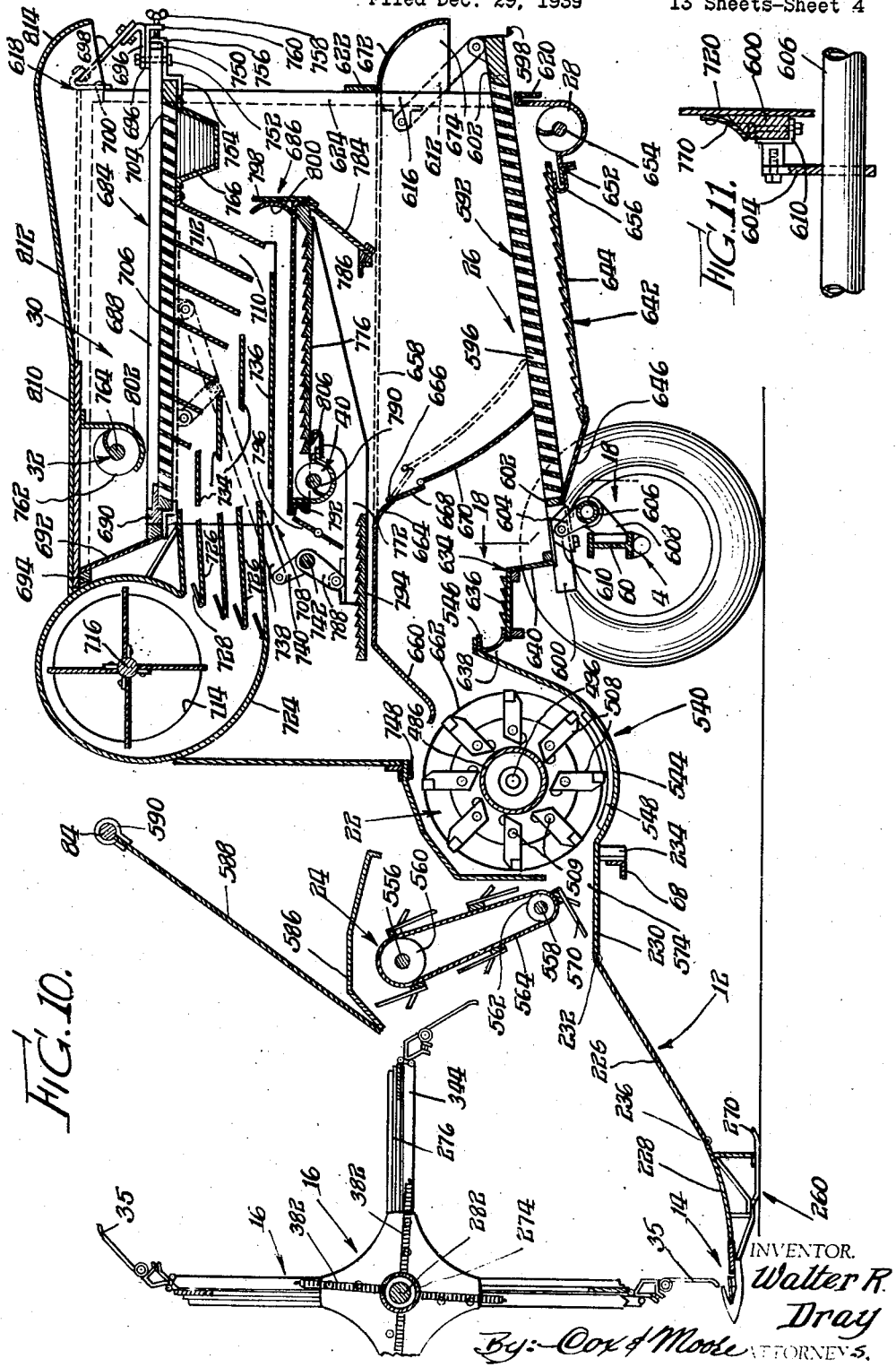

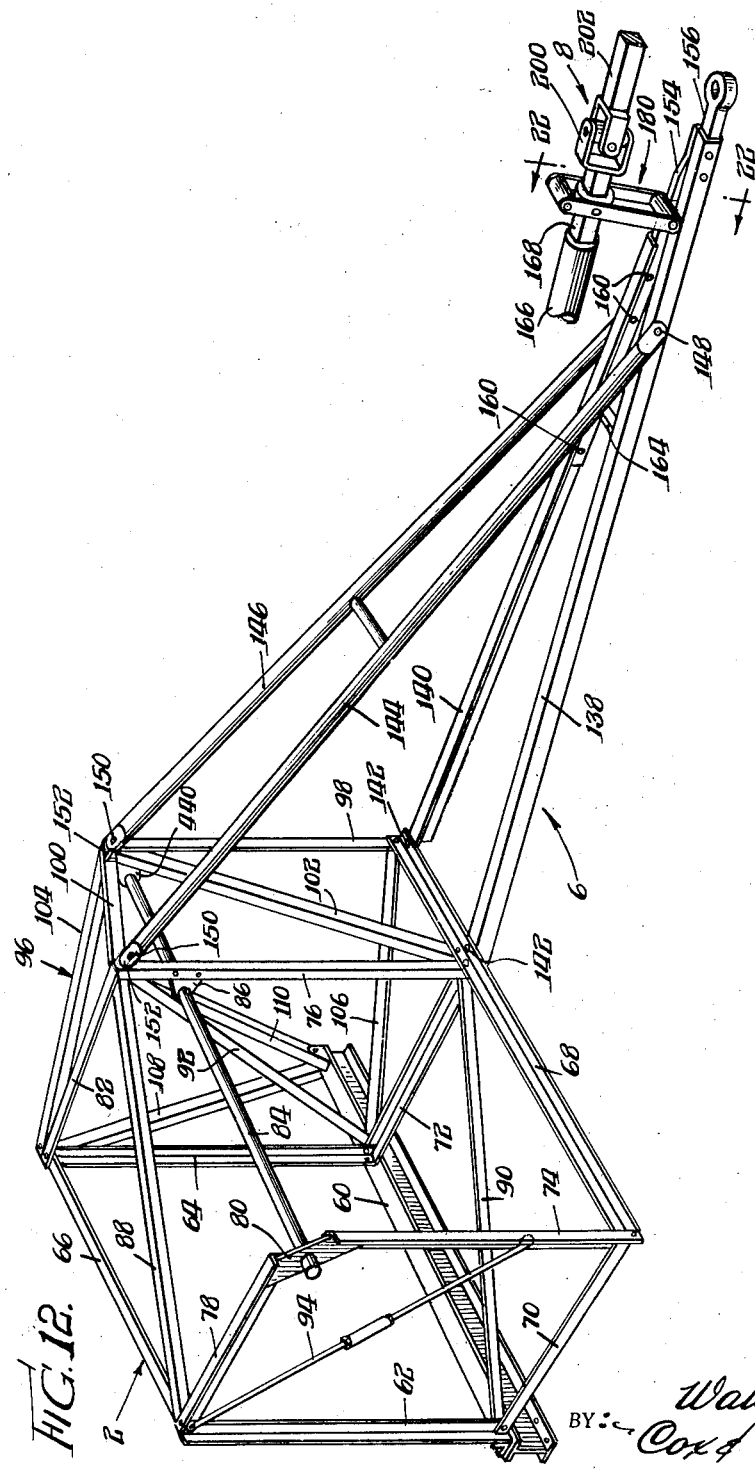

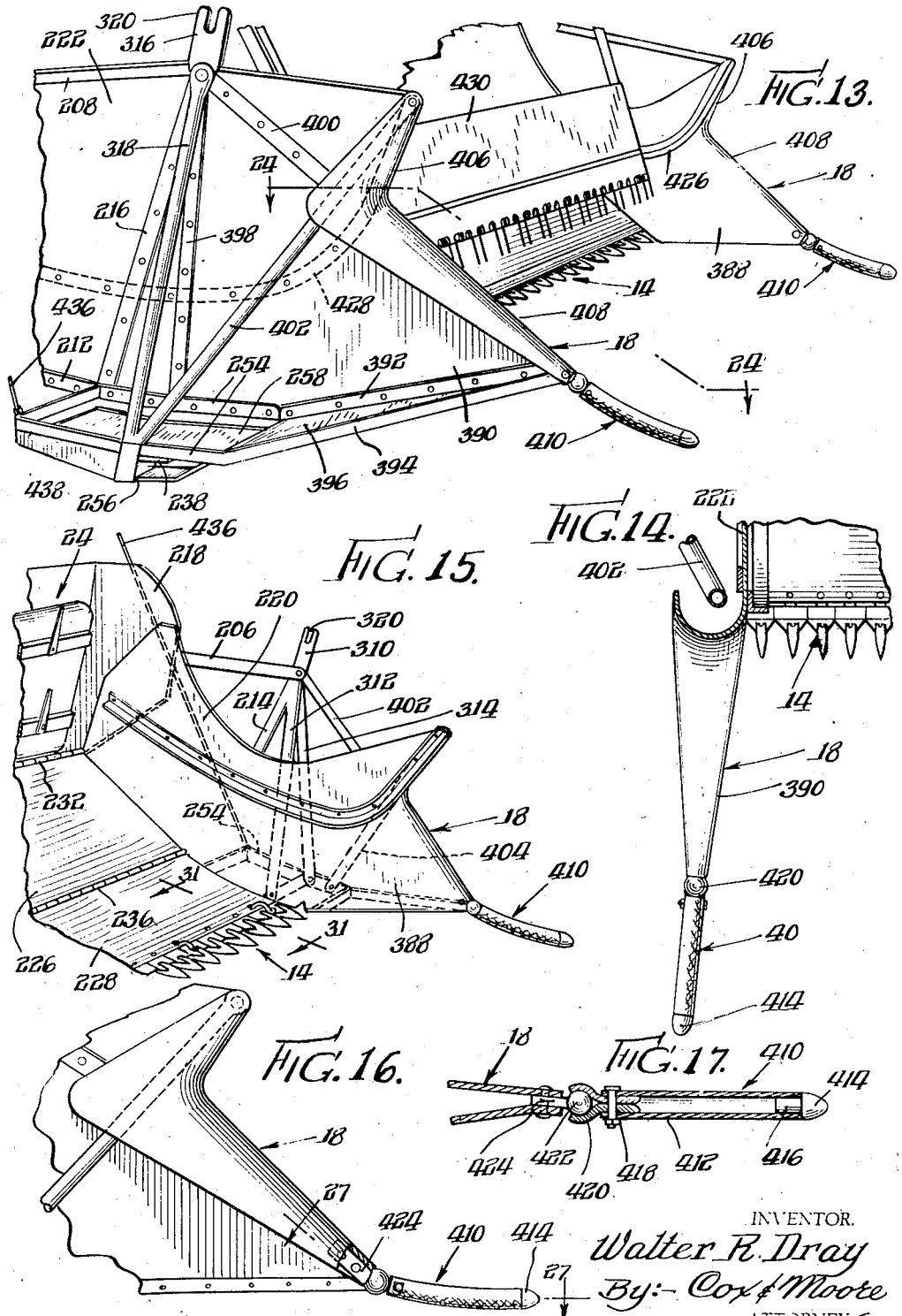

June 27, 1944.   W. R. DRAY   2,352,257
HARVESTER-THRESHER COMBINE
Filed Dec. 29, 1939   13 Sheets-Sheet 7
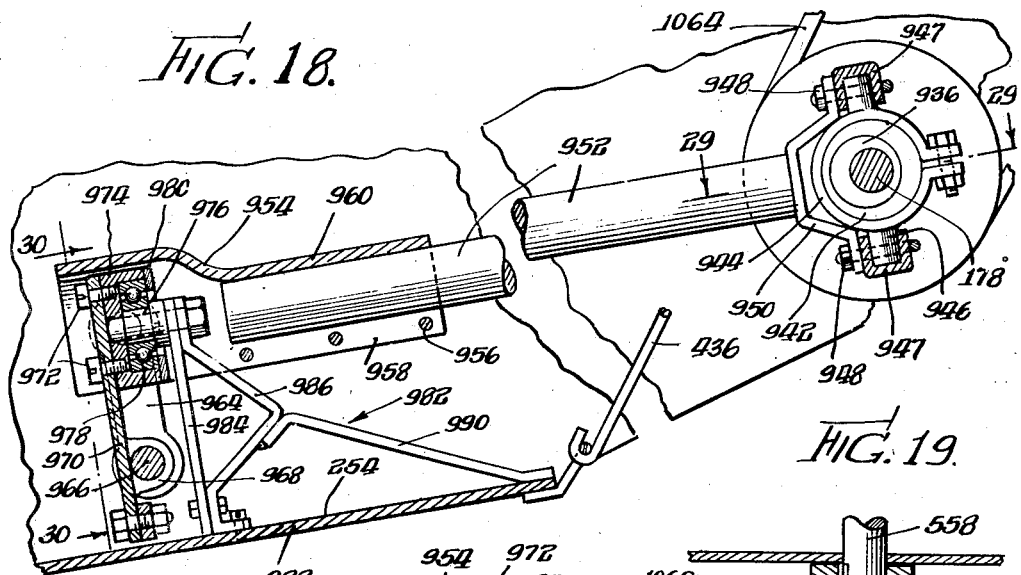
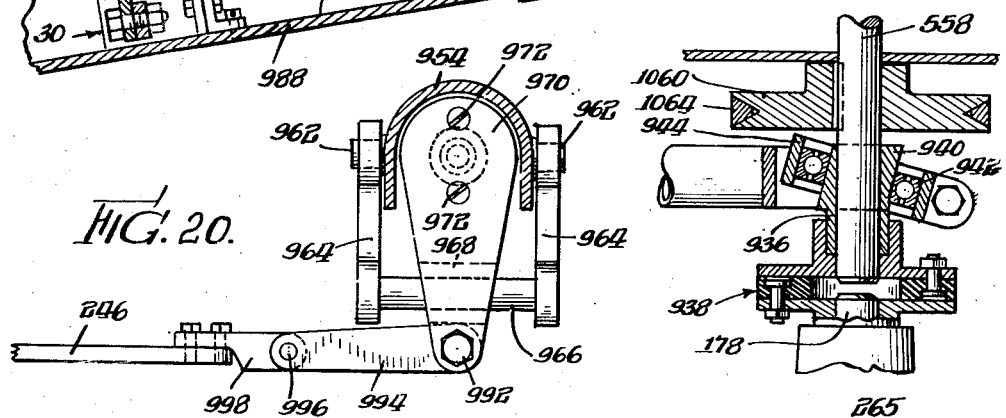
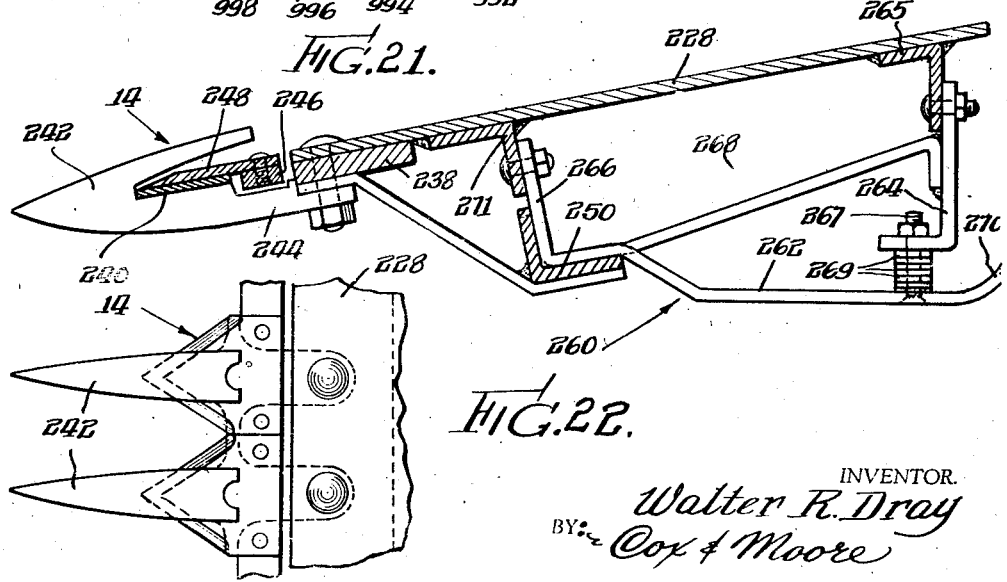
INVENTOR.
Walter R. Dray
BY Cox & Moore
ATTORNEYS.

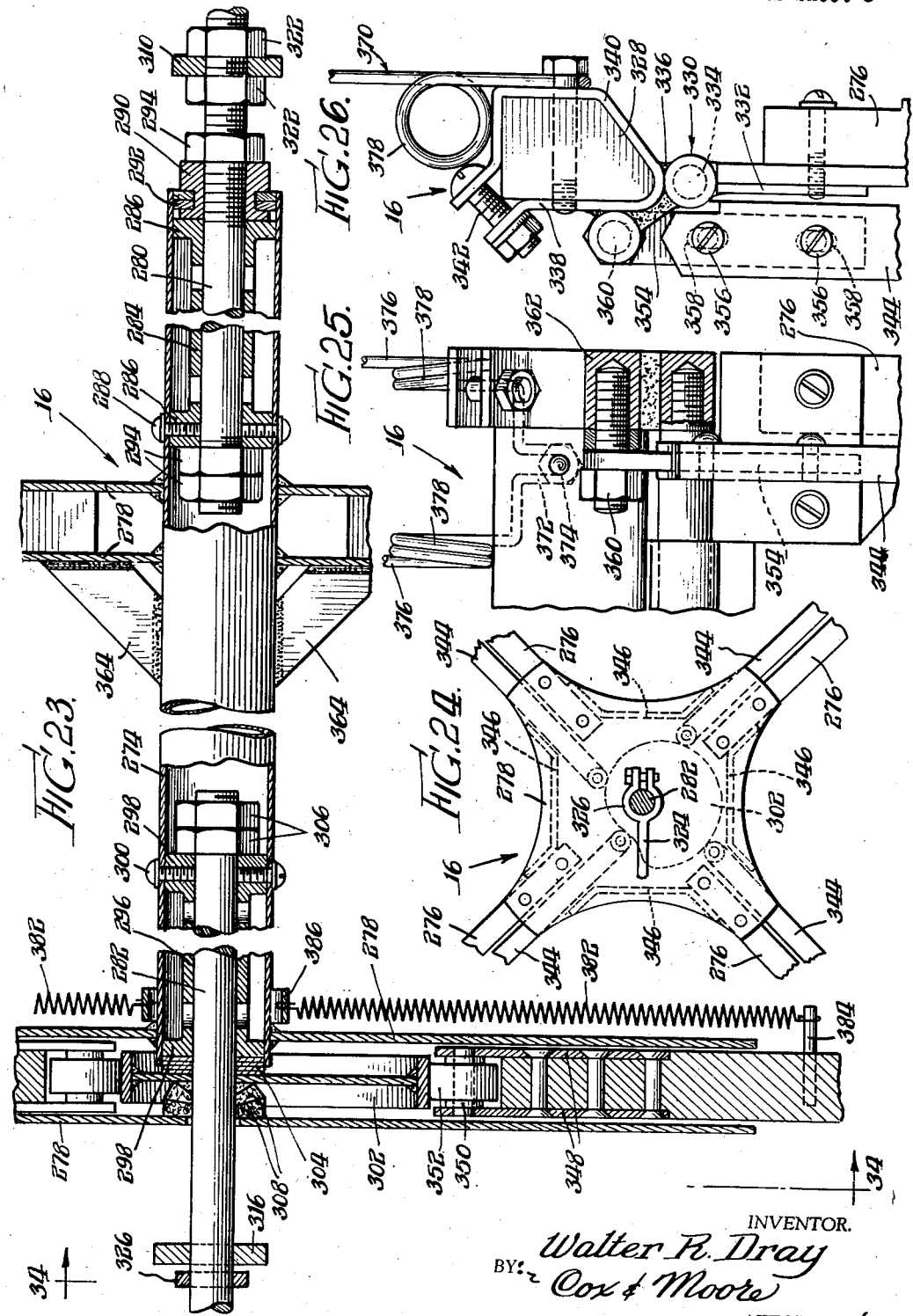

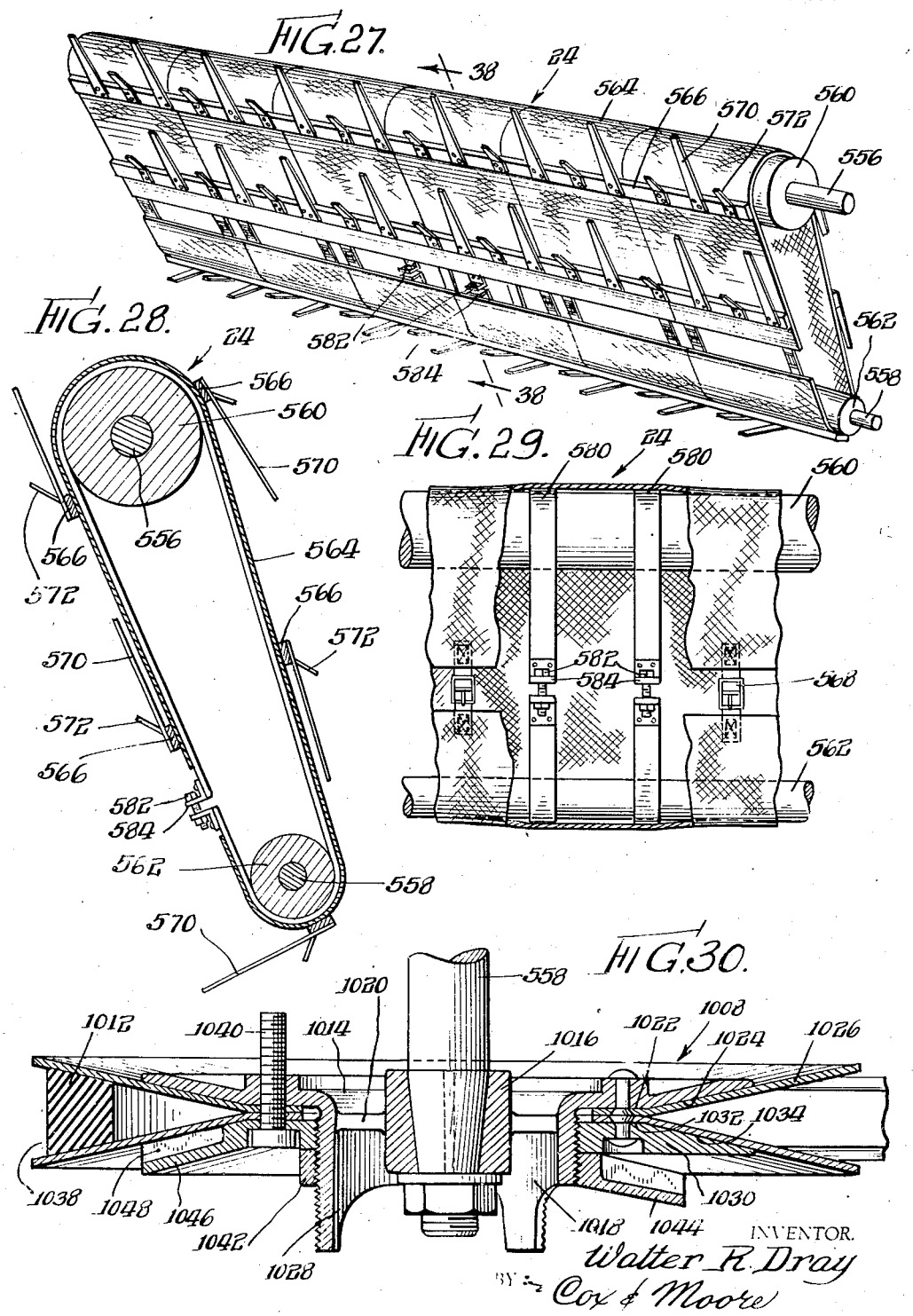

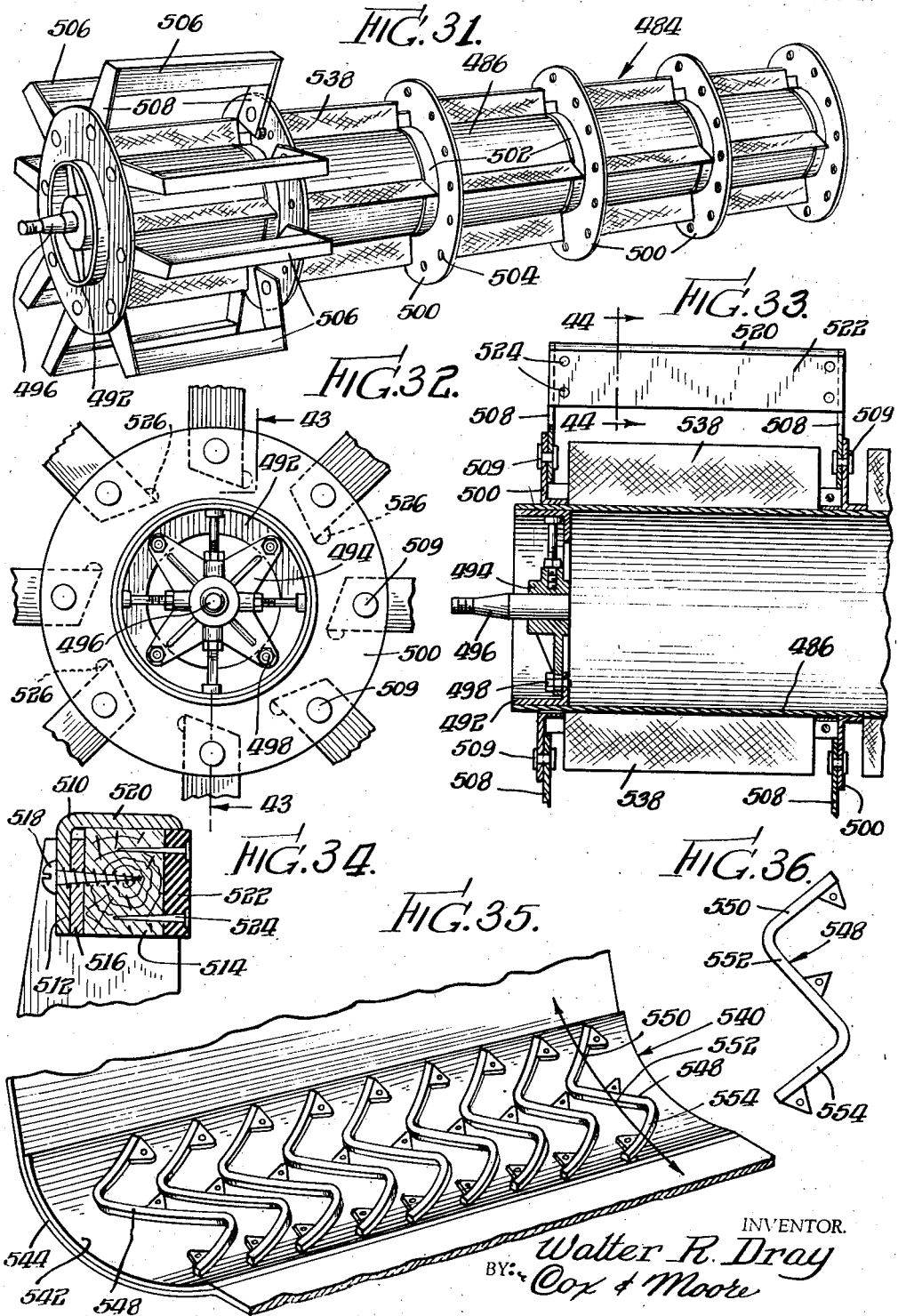

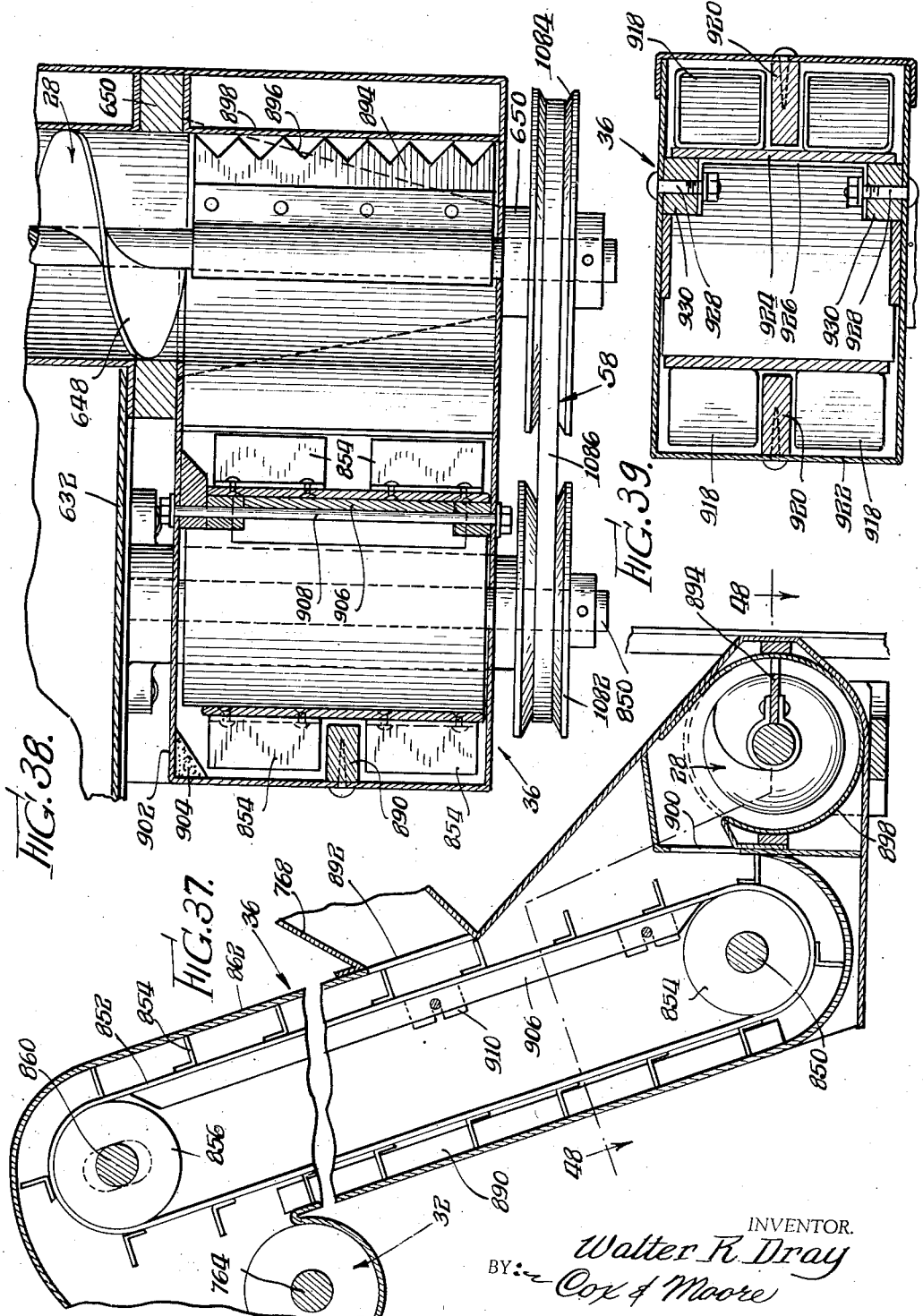

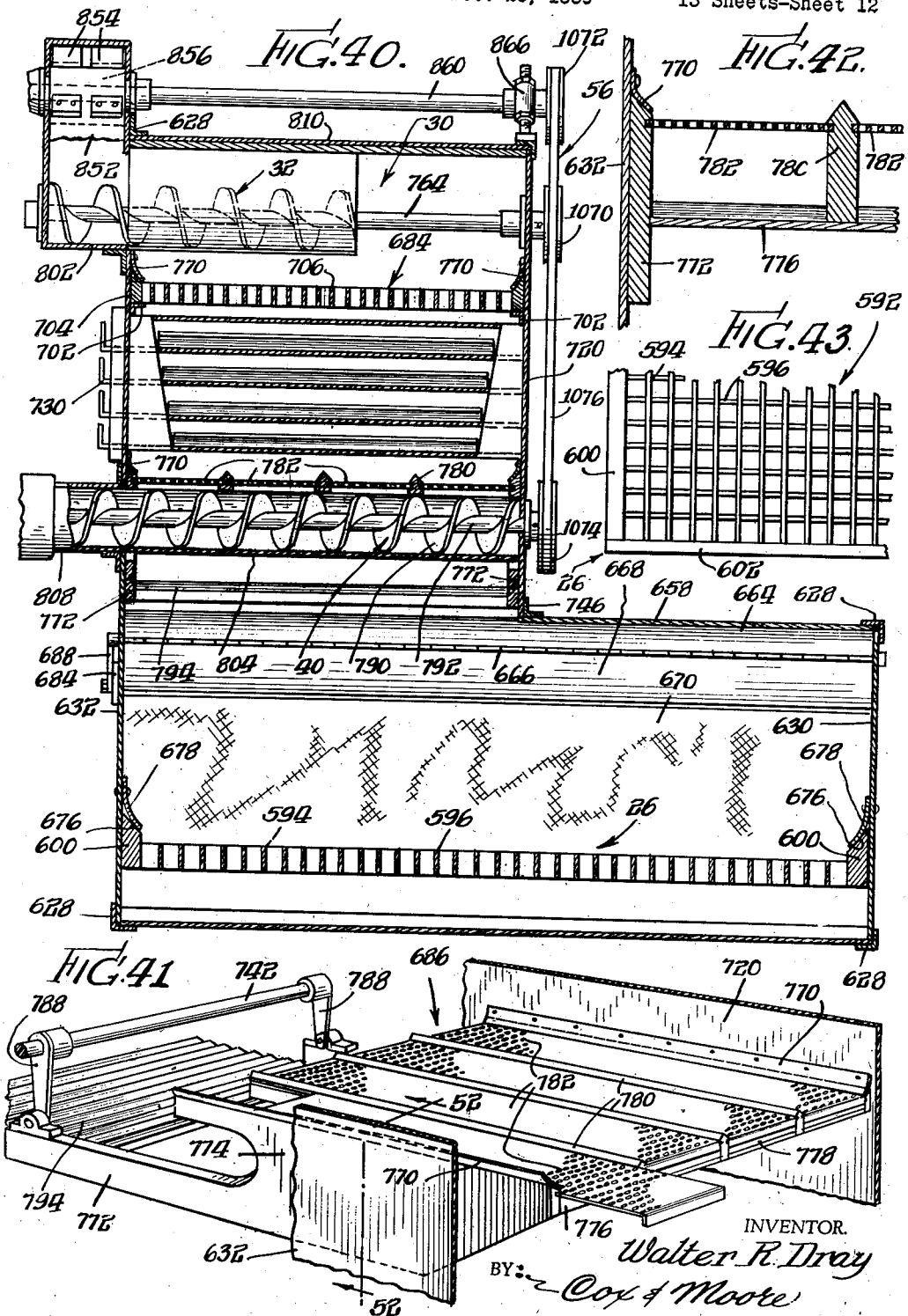

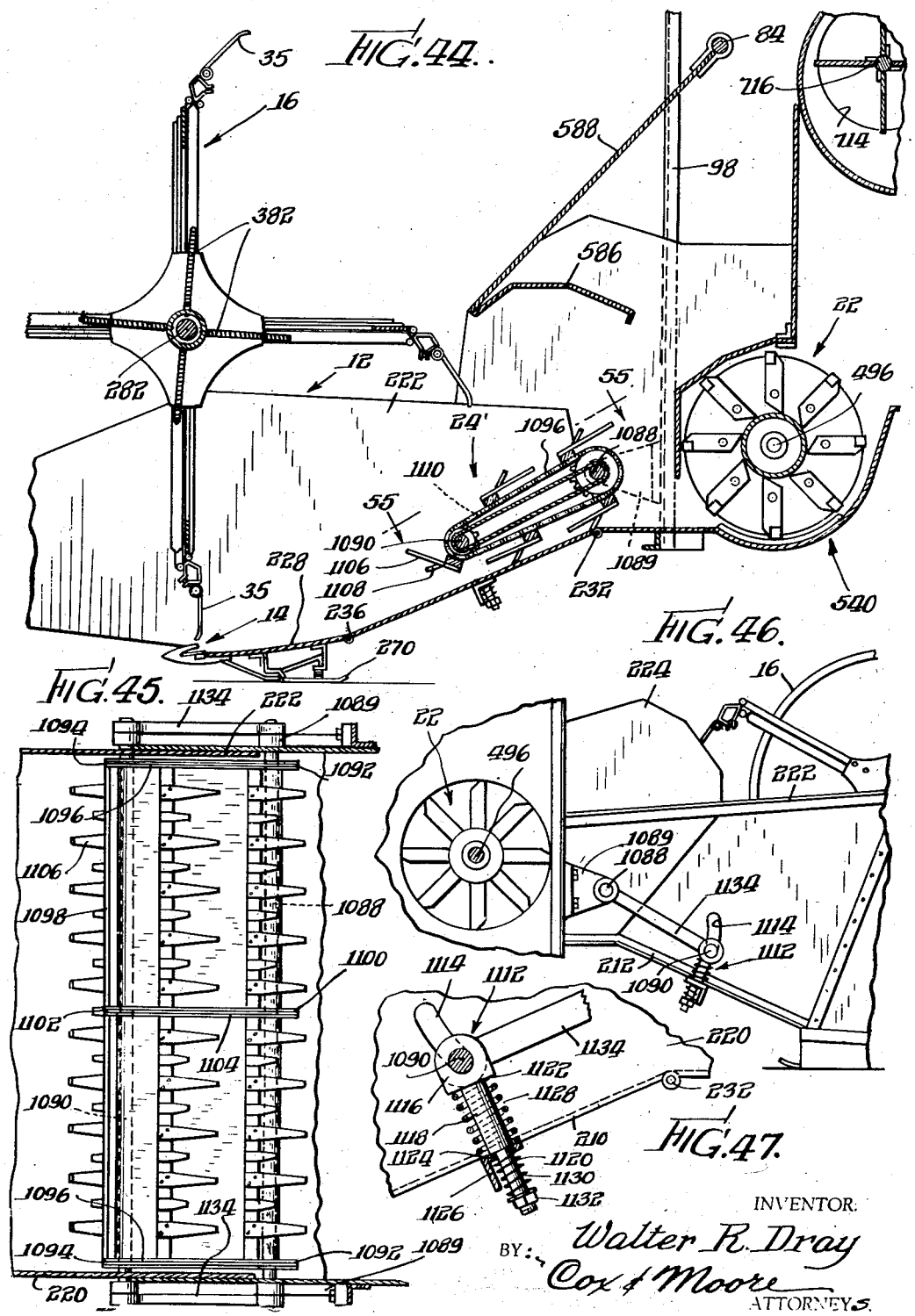

Patented June 27, 1944

2,352,257

UNITED STATES PATENT OFFICE 2,352,257

HARVESTER-THRESHER COMBINE

Walter R. Dray, Geneseo, Ill.

Application December 29, 1939, Serial No. 311,572

15 Claims. (Cl. 56—21)

This invention relates to a harvesting-threshing machine or combine and more particularly to improvements in such a machine or combine.

It is a general object of the present invention to provide an improved harvesting-threshing machine which may be of more inexpensive construction, yet compact and rigid in character and capable of efficiently handling, with a minimum of adjustment or replacement of elements, substantially all manner of crops in various conditions of growth and is of considerably less weight than prior harvesting-threshing machines.

This invention further contemplates the provision of positive driving means between the main drive shaft carried on the main frame of the combine and the sickle mechanism carried at the forward end of a header swingably mounted on the main frame, and which driving connection is simple and efficient and includes means permitting the swinging of the header relative to the fixed drive shaft.

The invention also seeks to provide a simplified header construction having means for feeding the crop along the bottom, relatively non-shiftable wall of the header, and wherein the header is provided with forwardly projecting, outwardly flaring dividers for gathering in the crops which would otherwise be crushed by the machine as it travels through the field of crops.

It is another object of this invention to provide a simplified header lift mechanism, including means which may extend forwardly of the machine for manipulation by an operator on the tractor or other draft vehicle.

The applicant's invention further contemplates the provision of a harvesting-threshing machine, providing a crop-gathering header and means for so feeding the crops along the header by means of a reel adjacent the forward end of the header, that the usual canvas belt or conveyor extending along the header may be eliminated.

Other and further objects and advantages of the invention will be apparent from the following description when taken in conjunction with the accompanying drawings, wherein:

Fig. 1 is a fragmentary view in elevation of the left side of a harvester-thresher combine embodying the invention;

Fig. 2 is a fragmentary detail view in elevation of a header lift mechanism forming part of the invention;

Fig. 3 is a view in elevation of the right side of the combine shown in Fig. 1;

Fig. 4 is a view in vertical section taken substantially along the line 4—4 of Fig. 3;

Fig. 5 is a view in elevation of the rear of the combine shown in Fig. 1;

Fig 6 is a fragmentary view in vertical section taken substantially along the line 6—6 of Fig. 1;

Fig. 7 is a fragmentary view in vertical section taken substantially along the line 7—7 of Fig. 5;

Fig. 8 is a fragmentary view in vertical section taken substantially along the line 8—8 of Fig. 5;

Fig. 9 is an enlarged fragmentary view in vertical section taken along the line 9—9 of Fig. 8;

Fig. 10 is a longitudinal section taken substantially along the line 10—10 of Fig. 5;

Fig. 11 is a fragmentary section taken along the line 11—11 of Fig. 10;

Fig. 12 is a view in perspective showing the frame structure, the draft connection to the frame structure, and the manner in which the power take-off propeller is supported upon the draft connection;

Fig. 13 is a fragmentary view in perspective taken from the front and on the right side of the machine and illustrating certain details of the header construction;

Fig. 14 is a section taken substantially along the line 14—14 of Fig. 13;

Fig. 15 is a fragmentary view in perspective, showing certain details of the header construction;

Fig. 16 is a fragmentary view in elevation showing certain details of the header structure and the mounting of a crop-lifting member;

Fig. 17 is a section taken substantially along the line 17—17 of Fig. 16;

Fig. 18 is a view in elevation and partly in vertical section showing the drive means for the sickle;

Fig. 19 is a fragmentary view in section taken along the line 19—19 of Fig. 18;

Fig. 20 is a view in vertical section on the line 20—20 of Fig. 18;

Fig. 21 is a longitudinal section taken substantially along the line 21—21 of Fig. 15;

Fig. 22 is a fragmentary plan view of the sickle;

Fig. 23 is an enlarged view in section taken substantially along the line 23—23 of Fig. 3 and illustrating certain details of the crop-feeding reel;

Fig. 24 is a fragmentary view in vertical section taken along the line 24—24 of Fig. 23;

Fig. 25 is a view in section taken substantially along the line 25—25 of Fig. 3 and illustrating certain details of the mounting of the crop-engaging fingers of the feed reel;

Fig. 26 is a fragmentary view in elevation illustrating the mounting of said crop-engaging fingers;

Fig. 27 is a view in perspective of a crop-feeder for feeding the crop from the header into the threshing mechanism;

Fig. 28 is an enlarged view in section taken substantially along the line 28—28 of Fig. 27;

Fig. 29 is a fragmentary view in elevation of the feeder shown in Fig. 27, with certain parts broken away for purposes of illustration;

Fig. 30 is an enlarged horizontal section taken substantially along the line 30—30 of Fig. 3 and illustrating a change speed drive for the threshing mechanism;

Fig. 31 is a view in perspective of the threshing cylinder forming part of the threshing mechanism;

Fig. 32 is a fragmentary view in elevation of the threshing cylinder;

Fig. 33 is a substantially vertical section taken along the line 33—33 of Fig. 32;

Fig. 34 is a fragmentary view in section taken along the line 34—34 of Fig. 33;

Fig. 35 is a fragmentary view in perspective illustrating the concave which cooperates with the threshing cylinder to form the threshing mechanism;

Fig. 36 is a detail view illustrating the form of the bars which form part of the concave;

Fig. 37 is an enlarged view in vertical section taken substantially along the line 37—37 of Fig. 5 and illustrating certain details of a grain and chaff elevator;

Fig. 38 is an enlarged horizontal section taken substantially along the line 38—38 of Fig. 37;

Fig. 39 is an enlarged generally horizontal section taken substantially along the line 39—39 of Fig. 1;

Fig. 40 is a fragmentary view in vertical section taken along the line 40—40 of Fig. 1;

Fig. 41 is a view in perspective of one unit of the grain cleaner and conveyor;

Fig. 42 is a fragmentary view in vertical section taken substantially along the line 42—42 of Fig. 41; and Fig. 43 is a fragmentary plan view of a screen for conveying the stalks and separating the grain and chaff therefrom.

Fig. 44 is a view of a portion of a longitudinal section similar to Fig. 10, but showing a modified form of feeder and a modified form of mounting therefor;

Fig. 45 is a view in section taken substantially along the line 45—45 of Fig. 44;

Fig. 46 is a fragmentary view in elevation from the right side of the machine of Fig. 44;

Fig. 47 is a view in elevation and partly in section on the left side of the machine of Fig. 44;

As shown in the drawings, the machine in which the present invention is embodied comprises a main frame 2, Figs. 1, 3, 5 and 12; supporting a power take-off or propeller 8, Figs. 1, and 12, adapted to be detachably connected to the draft bar and propeller shaft of a tractor 10; a header 12, Figs. 1, 3, 10, 13 to 17, which supports a sickle 14, Figs. 3, 10, 13 to 15, 21 and 22, and includes a crop-feeding means or reel feed 16, Figs. 1, 3, 10, 23 to 26; crop-gathering means or dividers 18, Figs. 1, 3, 5, and 13 to 17; and a header lift mechanism 20, Figs. 1 to 3; a threshing mechanism 22, Fig. 10 and Figs. 31 to 36; a feeder 24, Figs. 10 and 27 to 29, for feeding the fodder from the header 12 into the threshing mechanism 22; a rack or conveyor 26, Figs. 5, 10, 40 and 43, for conveying the stalks from the threshing mechanism to the point of discharge from the machine including means for separating the grain and chaff from the stalks and for conveying the chaff to a feed screw 28, Figs. 5, 10, 37 and 38; a cleaner 30, Figs. 10 and 40 to 42, receiving grain and chaff from a feed screw 32, Figs. 10, 37 and 40; a grain receiving tank 34, Figs. 1, 3, 4, and 5; an elevator or grain and chaff conveyor 36, Figs. 1, 5, 6, 37 and 38, for feeding grain and chaff from the feed screw 28 to the feed screw 32; an elevator or grain conveyor 38, Figs. 1, 3, and 5, for feeding the grain from the grain receiving feed screw 40, Figs. 10 and 40, of the cleaner to the grain tank 34; a drive mechanism 44, Figs. 1 and 18 to 20, for the sickle 14; driving connections 46, Fig. 1, for the reel feed; change speed driving connections 48, Figs. 3 and 30, for the threshing mechanism; driving connections 50, Figs. 1 and 10, for the rack or conveyor 26; driving connections 52 and 54, Fig. 1, for certain parts of the cleaner 30; driving connection 56, Figs. 3, 5 and 40, for the feed screws 32 and 40 and for the elevators 36 and 38, and a driving connection 58, Figs. 1 and 38, for the feed screw 28.

*The main frame and wheel members*

As best shown in Fig. 12, the main frame 2 comprises a main transverse member or I-beam 60 to which is secured at one end an upright member or angle bar 62. A second upright member or angle bar 64 is secured to the beam 60 intermediate the ends of the latter and it should be noted that this member 64 is of greater length than the member 62. An inclined member or angle bar 66 connects the members 62 and 64 at their upper ends, and a second transverse frame member or angle bar 68 extends parallel to the beam 60 and is secured thereto by longitudinal members 70 and 72 which may be angle bars, if desired. Vertical frame members or angle bars 74 and 76 are secured to the transverse frame member 68, the member 74 being secured to one end of the member 68 and the member 76 being secured substantially at the point of connection of the member 72 to the member 68. The member 74 is shorter than the corresponding upright member 62 while the member 76 is substantially the same length as the corresponding upright member 64.

A longitudinal frame member 78 is connected to the upper end of the upright 62 and at its forward end is connected by a plate or bracket 80 to the upper end of the upright 74. A longitudinal frame member 82 connects the upper ends of the uprights 64 and 76. A horizontal shaft 84 journaled in the plate 80 and in the bracket 86, secured to the upright 76, extends transversely beyond the upright 76 and provides in effect an upper transverse frame member connecting the uprights 74 and 76. The frame members 60 to 82 and the shaft 84 constitute a substantially box-like main frame portion rigidified against movement or deflection by diagonal frame members 88 and 90 secured to and extending between the upper and lower ends of the frame members 62 and 76 and rigidified against vertical movement or deflection by an inclined frame member or angle bar 92 extending between the lower end of the upright 64 and the upper end of the upright 76 and an inclined frame member 94 which may be an adjustable strap, as shown, extending between the upper end of the upright 62 and an intermediate point along the upright 74.

The main frame 2 comprises, in addition to the box-like frame portion above described, a tank-supporting frame portion 96 which also serves to rigidify and strengthen the box-like frame portion. This frame portion 96 comprises an upright member or angle bar 98 secured to the other end of the frame member 68 from the upright 74, the upright 98 being shorter than upright 76 and being connected thereto by an inclined frame member or angle bar 100 and an angle bar 102 which extends between the lower end of the upright 76 and the upper end of the upright 98. The frame member 104 extends between the upper end of the upright 64 and the upper end of the upright 98. The upright 98 is also connected to the lower end of the upright 64 by the frame member or angle bar 106. It will be seen that the diagonal frame members 100 to 106 further rigidify the box-like frame portion as against vertical and horizontal movements or deflections. A diagonal frame member 108 extends between one end of the beam 60 and the upper end of the upright 64, and a diagonal frame member 110 extends between this same end of the beam and the upper end of the upright 76. These diagonal frame members 108 and 110 additionally rigidify and strengthen the box-like frame portion against vertical and horizontal movements or deflections.

It should be noted that the transverse frame member or beam 60 is shorter in length than the forward transverse frame member 68, and that the frame portion 96 does not embody a longitudinal frame member connecting the beam 60 to the upright 98.

A power take-off connection 8, shown in Figs. 1 and 12, comprises a propeller tube or shaft 166 slidably receiving at its opposite ends telescoping propeller bars 168 and 170, the bars being secured against rotation relative to the propeller tube or shaft. For this purpose the bars 168 and 170 may be of stock rectangular in cross section and received within similarly shaped openings in the tube or shaft 166. The bar 170 is connected by a universal coupling or joint 172 to a rod or shaft 174 in turn connected by a transmission mechanism 176 to the main drive shaft 178 of the harvester-thresher combine.

The bar or shaft 168 is pivotally supported on the forward end of the auxiliary frame or draft connection 6 by means of a yoke 180.

A universal coupling or joint 200 connects the forward end of the bar 168 to a similar bar 202 provided at its forward end with the usual means for connecting the propeller shaft of the harvester-thresher combine with the power take-off shaft of the tractor.

*The header*

The header 12 comprises a frame work including upper and lower parallel bars 206, 207, 208, 210 and 212 (Figs. 1, 3, 13 and 15) pivotally secured at their rear ends to brackets as 213 (Fig. 1) carried by the upstanding frame members 74, 76 and 98, the bars 206 and 207 converging at their forward ends and being interconnected with the bar 210 by a rod 214 (Figs. 1 and 15) and the bars 208 and 212 being interconnected by a bar or strap 216 (Figs. 3 and 13). The side walls of the header are formed by sheet metal plates 218, 220, 222 and 224, the plate 220 being secured at its lower edge to the bar 210, the plate 222 being secured to the bars 208 and 212, and the plates 218 and 224 being secured to and projecting forwardly from the frame bars 74 and 76 respectively in overlapping end relation to the plates 220 and 222.

The bottom of the header along which the crop is fed to the feeder 24 comprises relatively rigid sheet metal plates 226 and 228 extending between the side plates 220 and 222, the upper plate 226 being pivotally connected to a plate 230 (Fig. 12) as by a transversely extending hinge 232 substantially alined with the pivot connections of the bars 210 and 212 with the main frame 2. The plate 230 is supported upon the transverse lower frame bar 68 in any convenient manner as by bracket or brackets 234 (Fig. 10). The lower plate 228 is pivoted to the lower edge of the plate 226 by a transverse hinge 236. The forward edge of the plate 228 is secured to the transverse supporting bar 238 (Figs. 21 and 22).

The sickle 14 comprises a stationary blade 240 having spaced forwardly projecting and overhanging guard fingers 242. The blade 240 has rearwardly projecting portions 244 bolted to the supporting member or foundation bar 238. A transversely reciprocating bar 246 carries a plurality of saw-toothed shearing blades 248 which cooperate with the stationary blade 240 to cut the crop. The supporting member or foundation bar 238 is supported upon an angle bar 250 by a transversely extending sheet metal strap 252 welded at one end to the bar 250 and bolted to the member 238. The bar 250 extends transversely of the header and is secured at its opposite ends in any convenient manner to pairs of angle bars 254 on opposite sides of the header, which bars, as subsequently described, form part of a reenforcing frame for the dividers 18 and a support for one end of the sickle drive mechanism 44. The housing for the portion of the foundation bar 238 projecting beyond the right side of the machine is formed by a plate or plates 256 secured to the bars 254 and a plate 258 overlying the plate 256 and secured to said bars. The header is provided with a plurality of transversely spaced, adjustable ground-engaging shoes 260 (Fig. 21) for supporting the header when in lowered position. Each shoe comprises a sheet metal ground-engaging plate 262 resting on the bar 250 and secured to a strap 264 bolted for relative transverse adjustment to an angle bar 265 welded to the lower surface of the bottom wall section 228, the strap 264 being preferably bolted to the plate 262 for relative adjustment by bolt 267 and shims or washers 269. Straps 266 and 268, which may be formed integrally with the plate 262, extend between an angle bar 271, the angle bar 250 and the strap 264. The strap 266 is bolted, for relative transverse adjustment of the shoe, to the angle bar 271. The shoes 260 are of particular importance in harvesting low crops or crops which should be severed close to the ground as they cause the header to rise and fall as the machine passes over uneven ground so that the sickle and the forward end of the header will be maintained at the proper minimum distance from the surface of the ground. The rear end of the plate or skid 262 is turned upwardly as at 270 so that the combine may be backed without scooping dirt. The transverse adjustability of the shoes permits the shoes to be aligned with the crop ridges of a particular field or character of crop.

The crop feeding means or reel feed 16 comprises a reel 272 having a central tubular shaft 274 extending transversely of the header and supporting within the header adjacent the opposite side walls a plurality of radially extending arms 276 secured to hub plates 278 secured in any convenient manner to the tubular shaft 274. At its opposite ends the tubular shaft 274 is mounted upon solid, stationary shafts 280 and 282, the shaft 280 rotatably supporting a bearing sleeve 284 having enlarged end portions 286 engaging and supporting an end of the tubular shaft 274 and secured to the shaft 274 as by screws 288. A nut 290 on the shaft 280 has dust excluding washers 292 closing one end of the tubular shaft. The sleeve 284 is held against axial movement on the shaft 280 by the nut 290 and adjusting and jam nuts 294.

The sleeve 296, Fig. 23, is journaled on the shaft 282 and has enlarged end portions 298 engaging and supporting the other end of the tubular shaft 274 and fastened to the tube as by the screws 300. A cam 302 is welded or otherwise fastened to the shaft 282 and is disposed between the pair of hub plates 278 at the right-hand end of the tubular shaft which terminates between these uprights. Thrust washers 304 interposed between the radial face of the cam 302 and the end of the sleeve 296 prevent relative axial movement of the cam and sleeve in one direction and exclude dirt and dust from this end of the tubular shaft. Axial movement of the tubular shaft and sleeve 296 in the opposite direction is prevented by the adjusting and jam nuts 306. Rubber-like washers 308 are mounted on the shaft 282 and interposed between the outer hub plate 278 and the cam 302 to prevent dirt and stalks from getting into the space between the hub plates 278.

The shaft 280 is mounted on the bar 310 (Figs. 15 and 23) projecting upwardly from an angular brace or support having arms 312 and 314 secured to or formed integrally at their upper ends with the rod 214. The shaft 282 is mounted on a bar 316 (Figs. 13 and 20) extending upwardly from a rod 318 secured at its lower end to the outer angle bar 254. The bars 310 and 316 are each provided with slots 320 receiving the ends of the shafts 280 and 282 for adjustment in a vertical direction as may be desired. Jam nuts 322 on the shaft 280 at opposite sides of the bar 310 prevent axial movement of the reel.

A lever 324 (Fig. 24) having a split hub 326 is clamped on the outer end of the shaft 282 and provides readily operable means for angularly adjusting the cam 302 secured to the shaft.

The radial reel arms 276 at opposite ends of the tubular shaft 274 support reel bats or bars 328, Fig. 26, which are pivotally mounted on the arms as by hinge brackets 330, each having a strap 332, a hinge pin 334 and a hinge strap 336 having strap portions 338 and 340 embracing an end of the reel bat 328 and clamped thereto as by a bolt 342 fastening the ends of the strap portions 338 and 340. The reel bats 328, as well as the reel arms 276, are preferably of wood and preferably there are four sets of each. That is to say, there are four pairs of opposite reel arms 276 interconnected by four articulated reel bats 328. The reel bats 328 are swung through angles of roughly ninety degrees during each revolution of the reel, and this accomplished by means of the stationary cam 302 through operating links or pitmans 344 at the right-hand side of the reel. The links 344 extend parallel to the reel arms 276 at this end of the reel and are guided for reciprocative movement relative to the reel arms 276 by straps 346 secured to the hub plates 278 at the right end of the tubular shaft 274. The straps 346 extending between these hub plates 278 form a completely closed housing for the cam 302, thereby preventing dirt, stalks and such like from jamming the links 344. Each link 344 carries at its inner end a pair of spaced sheet metal plates 348 extending beyond the link and supporting between their extending ends as by a pin 350 a cam roller 352. Each link 344 at its outer end is adjustably connected to a tip or extension bar 354 by bolts 356 passing through slots 358 in the bar 354. The bar 354 is connected to the strap portion or lever 338 of the hinge strap 330 at the right end of the reel by a pivot bolt 360 threaded into a boss 362 formed on the hinge strap portion 338 above the pivot bolt 334. Each link 344 is only loosely guided between its associated reel arm 276 and guide strap 346 so as to permit the link to swing through the slight angle necessary to accommodate the swinging of the hinge strap 336 to which it is connected. The hub plates 278 on the tubular shaft 274 at the left-hand side of the header are bolted together and to the radial arms 276 at this end of the shaft. The hub plates are welded to the shaft 274 and are further secured to the shaft by being welded thereto and by angularly spaced members or straps 364 welded or otherwise secured to the inner hub plate and to the shaft. The radial arms 276 at this side of the header, by means of straps 366 (Fig. 1), support a pulley rim 368 by which the reel 272 is driven through the arms 276, the hub plates 278 and the straps 364 at the left-hand end of the header.

Each reel bat is provided with a plurality of sets of reel fingers 370 spaced longitudinally thereof substantially across the entire width of the header. Each set of reel fingers comprises a relatively rigid wire formed centrally with a U-shaped portion 372, Figs. 25 and 26, receiving an attaching bolt or screw 374 by which the set of reel fingers is secured to the bat 328, and with spaced reel fingers 376 projecting radially of the reel outwardly beyond the bat and joined to the central portion by coiled portions or convolutions 378 inwardly of the fingers and resting upon the outer edge of the reel bat. The outer free end of each reel finger 376 is preferably bent as at 308 (Fig. 3) in the direction of rotation of the reel to facilitate the release of the crop from the reel fingers at the proper time. The reel fingers constitute in effect the prongs of four rakes which grasp the crop and as the reel is rotated, feed it across the sickle and longitudinally of the header to the feeder 24 and then release the crop for movement by the feeder into the threshing mechanism 22. The reel fingers 376 are readily yieldable by virtue of their construction and particularly by virtue of the coiled portion 378 of each reel finger to prevent jamming of the reel by heavy crops which may be grasped by the fingers but not yet cut by the sickle.

The reel fingers are extended radially of the reel as the fingers grasp and carry the crop along the header but as the fingers pass the feeder 24 they are swung through an angle of ninety degrees in a direction opposite to the direction of rotation of the reel so that the crop will drop off the fingers in front of the feeder as the crop is transferred to the feeder. This angular movement of the fingers relative to the reel is accomplished by the stationary cam 302 which, as shown in Figs. 1, 3 and 24, moves each link 344 outwardly relative to its associated reel arm 276 as the associated reel bat swings downwardly and rearwardly toward the sickle 14. As a reel bat passes in front of the feeder 24, the relieved portion of the cam 302 permits the associated link 344 to move inwardly and therefore rotate the reel bat through an angle of ninety degrees in a direction opposite to the direction of rotation of the reel. This inward movement of the links 344 is caused by coiled springs 382 connected at their outer ends to pins 384 carried by the links 344 and at their inner ends of a ring 386 concentric with the shaft 274.

The crop gathering means or dividers 18 comprise diverging side walls 388 and 390 formed as integral extensions of the side walls 220 and 222 of the header and projecting forwardly well beyond the sickle 14 so as to gather in the crop which would otherwise be crushed down and destroyed by the wheels of the machine and the appurtenances projecting beyond the sides of the header. The side wall 390 is supported and rigidified at its lower end by the framework comprising the straps 254 and the plate 258 extending therebetween and by angle bars 392 and 394 extending forwardly from the angle bars 254 and converging at the forward end of the wall 390. A plate 396 extending between the lateral flanges of the angle bars 392 and 394 cooperates with the plate 258 in preventing crops and stalks from becoming entangled with the bracing structure for the wall 390 of the divider, and also prevents, as will later appear, crops from becoming entangled with the header lift mechanism and the driving mechanism for the threshing mechanism 22, which driving mechanism is carried on the outer right-hand side of the machine and might otherwise become jammed by the crop or stalks.

A vertical reenforcing strap 398 extends along the outer surface of the wall 390 from the upper frame bar 208 of the header to the inner lower angle bar 254. A like reenforcing strap 400 extends from this bar 208 diagonally along the outer surface of the wall 390 and at its lower end is joined to the forward end of the frame bars 392 and 394. A reenforcing and frame rod 402 is formed integrally at its lower end with the rod 318 and extends upwardly and inwardly at an angle to a point of connection at the upper edge of the side wall 390. The side wall 388 is supported and reenforced by a similar frame structure, of which the angle bars 254 are connected to the lower ends of the rods 214, 312 and 314. In this case, however, the reenforcing strap 402 which corresponds to the reenforcing strap 400 extends not along the outer surface of the side wall 388, but outwardly of the pulley rim 368 and along the turned-over edge of the side wall 388 and an additional reenforcing strap 404 extends from the forward edge of the outer angle bar 254 to this turned-over edge of the side wall 388.

The forward edges of the side walls 388 and 390 are turned outwardly or rolled to provide upper and lower horns 406 and 408 respectively forming in effect "Y-dividers." The face of each horn is of convex configuration so that the crop will be directed smoothly and readily into the feed reel. At the lower ends of the horns 408 the dividers are provided with flexible snouts 410, each of which comprises a tube 412 of flexible material closed at one end by a bullet-shaped cap 414 having an inwardly projecting pin portion 416 frictionally grasped by the tube wall, or pinned thereto as may be desired. At its inner end each snout is secured by a bolt 418 to the socket plates 420 of a ball and socket universal joint of which the ball 422 is carried by a strap 424 fastened to the lower rolled edge of the horn 408 or the angle bars 392 and 394. The bolt 418 is so tightened as to frictionally bind the parts of the ball joint sufficiently to maintain the snout in its various adjusted positions.

Reenforcing and crop directing ribs are provided by angle bars 426 and 428 which extend from the upper ends of the horns 406 downwardly and then rearwardly along the side walls 388 and 390 of the dividers and the side walls 220 and 222 of the header, and are secured to the side walls in a convenient manner as by bolts or rivets passing through the vertical flanges of these angle bars. The dividers not only help to make the reel feed work better than previous reel feeds, but in cooperation with the reel feed, eliminate the need for the usual canvas draper and/or augur employed in substantially all present day harvester-thresher combines. The lower horns 408 pick up the crop and direct it upwardly while the diverging side walls 388 and 390 direct the crop inwardly toward the sickle and reel bat so that the crushing of the crops at the sides of the machine is eliminated and these crops properly harvested. The upper horns 406 and the ribs 426 and 428 direct the raised crops downwardly so that they do not jam at the sides of the reel nor become entangled with the reel bats or the extension panels 430 associated with each reel bat by being secured at their opposite edges to the radial arms 276 of the reel. The snouts 410 provide means which raise very low crops and direct them onto the horns 408. If a snout happens to snag itself in the ground or in heavy entangled roots or with stones, the snout bends backward and suffers no damage. After the obstruction is passed, the snout snaps back in position to continue its normal raising and dividing operation. If viny crops being harvested are too greatly entangled to be handled by the snouts in the down position shown in Figs. 13 to 15, they may be swung or tipped upwardly so as to ride over the bed of entangled crops and vines. In row crops where the ridges are high, the snouts may be set to ride below the level at which the sickle is cutting so as to pick up the crops or stalks out of the hollows between the rows or ridges.

The main purpose of the dividers is, however, to take care of leaning stalks which might otherwise get between a side of the reel and a side of the header and not get fed up into the feeder 24, and to divide such leaning stalks which are in the path of the machine and should be harvested from the stalks which are outside the path of the machine and on which the stalks to be harvested may lean or with which they may have become entangled. It will be evident that the snouts 410 can be swung in or out laterally to increase the dividing range of the dividers so that the machine may cut relatively narrow or wide swaths through the crop.

When the crop to be harvested is particularly tall, extension bars may be secured to the angle bars 426 to project upwardly above the horns 406 so that the unusually tall stalks of such crops are directed downwardly into the reel bats and are prevented from entangling between the sides of the reel and the sides of the header and are prevented from wrapping around the reel shaft or the reel bat extension panels 430.

The ribs 426 act as continuations of the upper horns 406 and tend to keep the cut crop down so that it will easily enter under the reel bats and be fed to the lower part of the feeder 24.

It will be evident that the dividers enable a swath to be cut through the crop wider than the width of the sickle and header.

The header lift mechanism 20 comprises the shaft 84 which forms part of the main frame 2, but is rotatably mounted in the brackets 80 and 86. A sprocket 432 (Fig. 3) is secured to the end of the shaft 84 at the right-hand side of the machine and this sprocket is coupled to and drives the chain 434 secured at its lower end to an inclined rod 436, the rod 436 being secured at its lower end to a bracket 438 secured to the header structure substantially in line with the hinge 236 which pivotally connects the bottom wall plates 226 and 228 of the header. As shown in Figs. 3 and 13, the bracket 438 is secured to or formed integrally with a rear end of the auxiliary box-like reenforcing frame structure formed by the angle bars 254 at the right-hand side of the machine.

At the left-hand side of the machine the shaft 84 extends beyond the main frame 2 (see Fig. 12) and is journaled in a rearwardly extending bracket 440 secured to the upright 98. A sprocket 442 (Fig. 2) is secured to the shaft 84 relatively adjacent the upright 76 and over this sprocket passes a chain 444 secured at its lower end to a rod 446 similar to the rod 436 and secured by a similar bracket 448 to the header structure substantially in line with the hinge 436 and in line with the point of connection of the rod 436 to the header structure. The other end of the chain 444 is connected to a spring or set of springs 450 (Fig. 1) secured at its rear end to one of the frame members as, for example, to the frame member 64 or 104 adjacent its upper end. A cylindrical ratchet 452 is secured to the shaft 84 adjacent the bracket 440 and journaled on the shaft in juxtaposition to the ratchet there is a lever 454 having oppositely extending arms 456 and 458. An opening 460 is formed in the lower end of the lever arm 456 and through this opening passes a pull cord or rope 462 which is connected at one end to a pawl 464 journaled on a pin carried by the lever arm 456 in position to engage the teeth of the ratchet 452. A coiled spring 466 urges the pawl in a counter-clockwise direction and normally maintains it in a position released from the ratchet 452. The pull cord or rope 462 extends forwardly from the lever arm 456, passes over a guiding cross bar 468 extending between the frame bars 144 and 146 of the draft connection 6, and rests at its forward free end in a holder secured to the seat of the tractor 10 or adjacent thereto so as to be readily manipulated by the tractor operator. A coiled spring 470 connected at one end to the right arm 458 and at the other end to the upright 98 urges the lever in a counter-clockwise direction.

A dog or pawl 472 is journaled on a pin carried by the frame bar 98 in position to engage the teeth of the ratchet 452 and lock the ratchet against movement in a counterclockwise direction. A coil spring 474 urges the dog 472 in a clockwise direction into normal engagement with the ratchet 452. A pull cord or rope 476 extends from the dog 472 to the holder secured to or positioned adjacent the seat of the tractor 10 so as to be readily manipulated by the operator. A coiled spring 478 is interposed in a section of the cord 476 relatively adjacent the dog 472 and a disc or collar 480 is secured to the cord adjacent the spring 478. The collar 480 cooperates with a generally U-shaped bracket or strap 482 secured to the frame bar 144 of the draft connection to hold the dog 472 out of engagement with the ratchet when the pull cord is placed between the arms of the strap and the collar engages the forward edges thereof. The coil spring 478 is stronger than the coil spring 474 when the collar 480 engages the strap 482 so as to insure that the dog will be maintained in its released position. The coil spring 478 also makes it possible by a sudden jerk upon the pull cord 476 to effect a snap release of the dog from one tooth and its engagement with the next succeeding tooth of the ratchet so that very fine adjustments may be made in lowering the header.

In order to raise the header, a pull is exerted upon the cord 462 and the movement of the cord first causes the pawl 464 to rotate in a clockwise direction relative to the lever arm 456 to engage a tooth of the ratchet 452 and the continued movement of the cord following the engagement of the pawl with the ratchet causes the lever arm 456 to rotate in a clockwise direction to effect a clockwise movement of the ratchet 452 and a raising of the header. Very fine adjustments in raising of the header may of course be obtained by the distance which the cord is pulled. When it is desired to raise the header a considerable amount, the cord may be pulled and released a number of times. The coil spring 470 upon release of the cord 462 returns the lever 454 in a counterclockwise direction so as to reposition the pawl 464 for engagement with a subsequent tooth of the ratchet.

In harvesting certain crops, better results may often be obtained if the height of the header above the ground is varied as the conditions of the crop and ground vary throughout the field. In prior harvester-threshing combines with which applicant is familiar, the difficulty of manipulating devices for raising and lowering the header and their inaccessibility to the operator on the tractor made the raising and lowering of the header a time-consuming operation and naturally resulted in failure to adjust the height of the header to obtain the most efficient harvesting of the crops of the entire field.

Applicant's header lift provides readily manipulatable means conveniently accessible to the tractor operator for raising and lowering the header at will through small or large amounts as desired so that without loss of time the tractor operator may raise and lower the header to most efficiently harvest different crops and crops of different condition in the same field.

When the dog 472 is held out of engagement with the ratchet the header rides upon the skid shoes 269 which are then in engagement with the ground. The skid shoes in effect cause the header to float upon the ground to raise and lower in accordance with the contour of the ground for the harvesting of low crops. These skid shoes are relatively long in a direction longitudinally of the machine so that they will not dig into the ground.

The threshing mechanism

The threshing mechanism 22 comprises a cylinder 484 (Figs. 31 to 33) including a relatively large tubular shaft 486 of relatively thin sheet metal extending the full width of the main frame portion 2 and between the sheet metal side plates 488 and 490 secured to the frame uprights 62, 64 and 66. A flanged disc 492 is positioned within each end of the tubular shaft 486 and is riveted thereto and each disc provides a mounting for a spider 494 having a hub spindle 496 for the cylinder. The spider 494 is secured to the flanged disc 492 by the bolts 498, which may receive between the spider and the flanged disc suitable shims by which the hub spindle 496 may be alined with the axis of the tubular shaft 486. Discs 500 each having a hub flange 502 are secured to each end of the tubular shaft 486 and at a plurality of equally spaced points as by means of rivets or bolts passing through the hub flanges 502. The discs 500 are provided with a plurality of angularly spaced openings 504 alined longitudinally of the tubular shaft. Between each adjacent pair of discs is mounted a plurality of angularly spaced threshing bars 506, each swingably mounted on the adjacent discs 500 by levers 508 carrying pivot bolts or rivets 509 which are received in the alined openings 504 of said disc. Each swinging threshing bar 506 preferably comprises an L-shaped angle bar 510 of which the flange 512 extends radially of the cylinder and has secured to its outer face a block 514 preferably of wood. The block 514 being spaced from the flange 512 or recessed at its ends permits a laterally extending portion 516 of each lever 508 to extend between the block and flange 512 and be clamped therebetween as by the screw 518 passing through openings in the flange 512 and the projection 516 and received in the block 514. The flange 520 of the angle bar 510 extends over the block 514 and partially over a rubber strip or block 522 fastened to the block 514 as by countersunk nails or rivets 524. The rubber blocks 522 provide radially extending portions serving as active threshing elements and provide surfaces of resilient material so that the active faces of the swinging threshing bars will not wear off so easily.

The swinging, threshing bars are prevented from rotating relative to the threshing cylinder beyond certain radially extending threshing positions by stops 526 secured to the faces of the discs 500 and engaging the forward edges of the levers 508. As the threshing cylinder is rotated, the bars 506 are swung by centrifugal force into the radially extended threshing positions wherein the levers 508 engage the stops 526. It will be seen, however, that the threshing bars 506 are free to swing in a direction opposite to the direction of rotation of the threshing cylinder to protect the bars from damage if a large stone or other unyieldable foreign matter is carried into the threshing mechanism and to prevent breakage of the cylinder or shaft due to sudden jamming of the cylinder.

Each of the shafts 496 at opposite ends of the tubular shaft 486 are journaled in a roller bearing 528 (Figs. 8 and 9) mounted in a split ring clamp 530 which in turn is welded or otherwise fastened to adjustable oppositely inclined supporting rods 532. The rods 532 are adjustably mounted in the sleeve portions 534 of brackets 536 bolted to the frame uprights 74 or 76. The adjustable supporting rods 532 provide ready means for assuring the axial alinement of the ends of the threshing cylinder so as to insure free running of the cylinder.

The tendency of the threshing cylinder to act as a fan and blow too great a volume of air such as would carry grain out of the end of the machine is minimized or prevented by wind suppressing strips 538, preferably of canvas, extending longitudinally of the tubular shaft between adjacent pairs of discs 500, there being preferably a plurality of angularly spaced strips 538 between each pair of adjacent discs and the strips preferably extending radially of the cylinder in alinement with the threshing bars when said bars are in extended position. The wind suppressing strips 538 may be secured to the surface of the tubular shaft 486 or the discs 500 in any convenient manner.

The threshing cylinder 484 cooperates with a stationary concave element 540 (Figs. 10 and 35) which includes a part circular sheet metal plate 542 secured to a generally circular housing portion 544 formed, if desired, as an integral extension of the sheet metal plate 230 (Fig. 10) and secured at its rear end to a transverse member or angle bar 546 extending between and fastened to the sheet metal side plates 488 and 490 or to suitable posts secured to the frame bars 70 and 72.

Zig-zag bars 548, which are each of generally concave-convex configuration in a vertical plane, with the concave side facing upwardly, are welded, riveted or otherwise affixed to the concave plate 542, and the upper edges of these bars are in relative close proximity to the path of the threshing bars 506. The zig-zag bars 548 in effect extend continuously from end to end of the threshing cylinder and each leg of each zig-zag bar preferably extends at an angle of substantially thirty degrees to the path of travel of the threshing bars 506. In other words, as shown in Fig. 35, the legs 550, 552 and 554 of each zig-zag bar 548 extend at substantially an angle of thirty degrees to the line "A" representing the path of travel of a threshing bar 506. Stated in still another way, the legs 550, 552 and 554 of each zig-zag bar 548 preferably extend at an angle of sixty degrees to the faces of the threshing bars 506. Applicant has found that the inclination of each leg of a zig-zag concave bar to the path of travel of the threshing bars at an angle of substantially thirty degrees is of great importance for minimizing cracking of the grain as compared to arrangements in which concave bars extend at forty-five to ninety degrees to the path of travel of the threshing bars. In fact, the zig-zag concave bar of approximately thirty degrees inclination so materially affects the performance of the threshing mechanism that it can efficiently handle all different types of crops without change in the spacing between the concave bars and the cylinder.

The threshing merit of a cylinder lies largely in its cracking-threshing ratio, which is the ratio between the speed at which the cylinder must be driven to get a satisfactory amount of grain out of the crop, and the speed at which the cylinder must be driven to substantially eliminate cracking of the grain. It is this ratio, or margin of safety between the two speeds that determines the practical efficiency of a threshing cylinder. The spike-toothed cylinder so commonly employed for threshing grain has an advantageous cracking-threshing ratio or margin of safety, but cylinders of this type have to have their concaves changed under various conditions, and worst of all, such threshing cylinders cut the grain leaves up so badly that they make cleaning of the grain very difficult and expensive. Also these spike-toothed cylinders cannot handle damp, tough stalks very well. Applicant's threshing cylinder has not only an advantageous cracking-threshing ratio equal to that of the spike-toothed cylinder, which has the best ratio of all the prior threshing cylinders, but by virtue of its construction the concaves do not need to be changed under various conditions or for various crops; the threshing cylinder does not cut up green weeds and has been found to handle damp, tough straw very well and without clogging.

The tubular shaft 486 of the threshing cylinder being of relatively large diameter is of such greatly increased stiffness over the known threshing cylinders that it does not need to be dynamically balanced as in the case of prior cylinders.

The feeder

The feeder 24 comprises upper and lower shafts 556 and 558 to which are secured elongated rollers 560 and 562 respectively, which rollers extend substantially the full width of the header between the opposed side walls 220 and 222. A belt 564 passes about the rollers 560 and 562 and extends substantially the full length of these rollers. The belt 564 is comprised of a number of belt sections arranged in abutting relation and fastened together by bars 566 extending from end to end of the combined belt 564 and secured thereto in any convenient manner as by rivets passing through the several belt sections and the bars 566, of which bars there are a plurality equally spaced along the belt. The free ends of each belt section are joined together by adjustable straps 568.

Each bar 566 carries a plurality of spaced relatively elongated metal fingers or prongs 570 alternating with shorter metal fingers or prongs 572. The elongated fingers 570 extend at right angles to their carrying bars in a direction opposite to the direction of movement of the belt 564 so that as they move between the rollers they lie in a position parallel to the face of the belt and project from the belt as they revolve around the axis of the lower roller 562 to feed the crop along the bottom of the header from the reel into the threshing mechanism 22. The fingers 572 extend from their associated bars in a direction opposite to the direction of rotation of the belt and outwardly therefrom to prevent the crop from being forced by the reel upwardly of the forward face of the feeder belt and to assist the fingers 570 in elevating the crop part of the way up the inlet 574 (Fig. 10) into the threshing mechanism 22, the inlet 574 being formed by a sheet metal plate 576 forming an upper wall for the housing for the threshing mechanism. The plate 576 is preferably secured to the side plates 488 and 490 (Figs. 1 and 3) and to the upright frame members and at its lower end terminates relatively adjacent the rear of the feeder 24 so as to prevent carrying of the crop upwardly along the rear surface of the feeder belt.

The shaft 556 which carries the upper roller 560 is journaled in the end brackets 578 (Figs. 1 and 3) secured to the upright frame members 74 and 76 and projecting forwardly beyond similar end brackets not shown in which the shaft 558 for the lower roller is journaled so that the feeder belt is inclined at an angle such as to further prevent the crop from being fed upwardly along the forward surface of the feeder belt.

As will subsequently appear, the lower feeder shaft 558 is driven from the power take-off 8 and the upper feeder shaft 556 is utilized to drive the reel feed 16. In order to positively assure rotation of the shaft 556 with the shaft 558 and prevent slippage of the feeder belt, straps 580 of leather or other frictional material are secured to the belt 564 and frictionally engage the surface of the rollers 560 and 562 at spaced points longitudinally of these rollers and the free ends of each strap are adjustably secured by a bolt 582 extending between angle pieces 584 riveted or otherwise secured to the free ends of the strap. The bolt 582 adjustably determines the tension of the straps 580 to insure simultaneous rotation of the upper and lower shafts 556 and 558 and to insure by reason of attachment to the feeder belt, operation of the feeder belt even when subjected to heavy crop loads of tough, damp or green crops which might otherwise cause the feeder belt to slip, thus permitting the crop to jam between the feed reel and the feeder.

The feeder belt is housed beneath a transverse covering plate 586 (Fig. 10), preferably of sheet metal which extends between the side plates 218 and 224 (Figs. 1 and 3) to form a shield which diverts loose grain which may be thrown upwardly by the slats of the feeder back onto the header. A transverse sheet metal plate 588 is mounted on the shaft 84 as by yokes 590 loosely encircling the shaft, the plate 588 resting upon or being secured at its lower edge to the forward portion of the plate 586 to form a diverting shield that directs straw thrown up by the reel so that it slides downwardly and forwardly into the reel and header so that it may be carried up the header into the feeder.

The novel feeder disclosed herein cooperates with the feed reel and the threshing mechanism to accomplish the following essential function, namely:

(1) To transfer the crop from the reel feed to the cylinder in such a manner that the usual canvas draper or belt at the bottom of the header may be eliminated.

(2) To block up the opening into the threshing mechanism so that the grain will not be thrown out by the cylinder.

(3) To hold back the crops being fed along the header so that they are not fed or sucked into the cylinder too quickly.

(4) To elevate the crop part way up the inlet to the threshing cylinder so as to obtain a better distribution of crop as it is being fed into the cylinder to improve the efficiency of the threshing accomplished by this cylinder.

(5) To prevent the crop from being carried over the top of the reel.

Other advantages of this novel feeder will be apparent from the foregoing description.

The stalk conveyor and separator

The stalk conveyor or separator 26 comprises a honeycomb rack 592 formed of spaced longitudinal sections or partitions 594 (Figs. 40 and 43) and transverse sections or partitions 596 (Figs. 10, 40 and 43) inclined at a very steep angle, preferably between 60 and 90 degrees, to the longitudinal dimension or axis of the rack. The rack partitions 594 and 596 are preferably made of bakelited fiber or equivalent material and are of a depth such in relation to the spacing between the partitions that stalks or straws will not catch in the rack, but the grain or chaff and similarly small particles will pass through the rack. The rack is preferably mounted in a frame 598 comprising longitudinal and transverse frame members 600 and 602, preferably of wood, the longitudinal frame members 600 being extended forwardly beyond the forward longitudinal frame member 602 (see Fig. 10). At its forward end the rack is mounted on rocker arms 604 secured to a rocker shaft 606 journaled in brackets 608 secured to the I-beam 60 of the main frame 2. The rocker arms 604, of which one only is shown in the drawings, are pivotally secured to the longitudinal frame members 600 of the rack 592 as by metal plates or brackets 610 fastened to these longitudinal members.

At its rear end the rack frame is mounted by links 612 pivotally secured to the rear transverse frame member 602 at its opposite sides and to upright angle irons or frame members 614 and 616 (Figs. 1, 3, 5 and 10) of a frame 618 supported on the main frame 2. The frame 618 comprises in addition to the members 614 and 616 a lower transverse frame member 620 connecting the lower ends of the upright frame members 614 and 616 and a transverse frame member 622 connecting the upper end of the upright 616 to an intermediate point of the upright 614. An upright 624 is secured to an intermediate point on the transverse member 622 and is secured to the upright 614 by diagonal straps or braces 626. Longitudinal frame members 628 connect the upper and lower ends of the uprights 614 and 616 to the uprights 62 and 64 of the main frame 2 and reenforce the side plates 630 and 632 which may be formed, if desired, as extensions of the side plates 488 and 490.

An upper carrier 634 is mounted on the forward ends of the longitudinal members 600 of the rack frame 598 in any suitable manner for movement therewith, the carrier comprising a plate 636 having a serrated upper surface for conveying the stalks and grain from the threshing cylinder onto the rack 592 as it moves with the rack. A flexible strip 638 extends transversely of the carrier 636 between the side plates 488 and 490 and is secured at its upper and lower edges to the bottom plate or wall 544 of the housing for the threshing cylinder and to the carrier plate 636 so as to form a flexible seal 638 between these parts preventing discharge of the grain from the forward end of the stalk conveyor and separator 26. This upper carrier 634 is positioned above the rack 592 and is connected thereto by a transverse, substantially vertical panel 640 which forms a raised part at the front of the rack and has a useful effect in causing the straw or stalks to start back over the rack after it is delivered down onto the surface of the rack.

The conveyor and separator 26 also includes a lower carrier 642 comprising a panel 644 having a serrated upper edge, the panel being mounted on the rack 592 for movement therewith by means of a plate or panel 646 fastened to the forward transverse bar 602. The lower carrier 642 conveys the grain and chaff and similarly small particles to the feed screw 28 which comprises an auger 648 on a shaft that is journaled in suitable brackets 650 (Fig. 38) secured to the uprights 614 and 616 of the frame 618 and to the lower longitudinal frame members 628. An angle bar or strap 652 extends between the brackets 650 and a housing for the auger is formed by a sheet metal plate 654 secured along one edge to the transverse frame member 620 and at the other edge to the angle bar 652. A transverse strip 656 of suitable flexible material is secured to the forwardly projecting flange of the angle bar 652 and to the lower surface of the panel 644 adjacent the rear edge thereof to provide a seal preventing material conveyed by the lower carrier 642 from being discharged between the panel and the auger housing. A hood 658, preferably of sheet metal, is positioned above the rack 592 and the upper carrier 634 and extends longitudinally of the machine between the side plates 488 and 630 and the right side plate of the cleaner chamber, hereinafter described. At its forward end the hood connects with a plate 659 extending between the side plates 488 and 490 and provided with a down-turned inclined portion 660 cooperating with the rear portion of the bottom wall plate 544 of the housing for the threshing mechanism to form an outlet opening 662 for the threshing cylinder.

Above the forward end of the rack 592 the hood plate 659 is provided with a down-turned portion 664 which extends transversely between the side plates and to which is pivoted as by a shaft 666 an angularly adjustable plate 668 extending transversely between the side plates and having secured to its lower edge a curtain 670 of flexible material. The curtain 670 extends downwardly into contact with or in close juxtaposition to the rack 592 to provide means which prevents the grain from being blown or projected through the conveying and separating chamber at such speed as to be discharged from the rear end of the machine, and to cause the grain to be deposited upon the surface of the rack so that it will be separated from the straw or stalks and deposited upon the lower carrier and carried by the lower carrier to the auger 648.

The hood 658 extends rearwardly beyond the uprights 614 and 616 and is formed with a downwardly curved rear wall portion 672 extending between the uprights 614 and 616 and having side walls 674, the hood portion 672 with its side walls 674 forming a shield directing the straw or stalks downwardly as they are discharged from the end of the rack so as to be deposited upon the ground in a row or swath so that the straw or stalks may not get into the rear end of the cleaner, nor be deposited among the uncut crops.

The rack 592 in its oscillating movement, of which the longitudinal rectilinear component of motion is considerably greater than the vertical component of motion, engages and is guided by the side plates 488, 490, 630 and 632. The longitudinal frame members 600 which engage these side plates are provided with beveled upper edges 676 overlapped by longitudinal strips 678 of rubber or similar material riveted or otherwise fastened to the side plates so that grain may not collect or be discharged between the longitudinal members 600 of the rack and the side plates.

Adjustment of the curtain 670 to different positions longitudinally of the rack as required for the efficient handling of different crops is effected by the crank 680 secured to the end of the shaft 666 projecting through the side plate 632. The outwardly turned operating end of the crank 680 is received in arcuate slot 682 of plate 684, secured in spaced relation to the side plate 632 and this operating end of the crank is threaded to receive a clamping nut by which the crank is held in its adjusted position along the arcuate slot.

The novel conveyor or separator rack performs the following principal functions:

(1) To convey straw, while
(2) Not conveying the grain;
(3) To separate the maximum amount of grain from the straw while causing larger particles differing a minimum amount from the grain to be conveyed and discharged with the straw;
(4) To convey the straw without being caught by the edges of the parts which define the separating screen.

Prior machines universally convey a certain portion of the grain and discharge it with the straw or stalks and catch stalks of certain kinds by the edges of the members which define the screen. Applicant's honey-comb racks do not do either. The reciprocating motion of the rack conveys the straw, but the unusually steep angle of the transverse rack sections or partitions actually bounce about as much grain toward the front of the machine as toward the rear when grain only is on the rack. The stalks cannot get down far enough in the deep openings between the partitions of the rack to be caught in these openings. The unusually steep angle of the transverse sections or partitions and their relatively great depth permit the spacing between these transverse sections to be reduced to the smallest amount necessary to permit the passage of grain and similarly small particles, and hence much trash which is separated with the grain in prior machines is by applicant's rack conveyed and discharged with the stalks. Hence such trash, principally sticks and leaves, is not conveyed to the cleaner and the cleaner can therefore more efficiently perform its principal function of separating the grain from the chaff and similarly small particles.

The cleaner

The cleaner 30 comprises an upper cleaner carrier 684 and a lower cleaner carrier 686. The upper cleaner carrier comprises a frame formed by longitudinal bars 688 having a transverse member 690 interconnecting their forward ends, the member 690 being secured to a resilient plywood panel 692 secured to a transverse bar 694. The bar 694 is secured to the side plates 488 and 490. The resilient plywood panel 692 forms a swinging mount for the forward end of the longitudinal bars 688. At the rear ends the bars 688 are each secured to a bracket 696 fastened to a leaf spring 698 secured to brackets 700 carried at the upper end of the vertical frame member 614 or 624. The bars 688 carry generally L-shaped depending hangers 702 detachably receiving a rack comprising longitudinal and transverse frame members 704 receiving a honey-comb screen or rack 706 similar in construction to the rack 592. The longitudinal frame members 704 support a grain and air directing means 708 which comprises longitudinally extending sheet metal plates 710 secured to the longitudinal frame members 704 and transverse inclined panels 712 depending from the rack or screen 706, the panels 712 being of increasing height from the forward end of the rack toward the rear thereof as shown in Fig. 10. The panels 712 with the side plates 710 form a plurality of inclined chutes directing air upwardly through the rack or screen 706 and conveying grain downwardly upon the rack.

A fan 714 which extends transversely the full width of the cleaner has its operating shaft 716 journaled in brackets (not shown) secured to an angle bar 718 (Fig. 3) fastened to the upper edge of a side plate 720 and to an angle bar 722 (Fig. 1) secured to the upper edge of the side plate 490 and to the uprights 64 and 76. A sheet metal housing 724 (Fig. 10) for the fan 714 is secured to these angle bars 718 and 722 and to the side plates 490 and 720. The outlet duct for the fan which is formed by the housing 724 is provided with a plurality of substantially horizontal transverse partitions 726 forming a plurality of air directing ducts individually controlled by valves 728 pivoted to the partitions 726 on rods 730 (Fig. 1) which extend outwardly through the side plate 490 and are received between the bars 732 fastened to the side plate, the outer ends of the rods 730 being bent at right angles to provide operating crank portions by which the valves may be angularly adjusted individually to control the several air ducts. Transverse plates or panels 734 arranged in echelon are secured to the side plate 710 of the air and grain directing means 708 in substantial horizontal alinement with the partitions 726. The plates 734 direct the air from individual ducts through different sets of the air directing and grain conveying ducts formed by the partitions 712 so that air from the different ducts of the fan or blower may be directed through longitudinally successive portions of the rack or screen 706. A bottom plate 736 secured at its sides to the side plates 710 terminates inwardly of the forward and rearward transverse walls or partitions 712 so that as the upper carrier oscillates, the grain drops off the edges of this bottom plate onto the lower cleaner carrier 686.

The longitudinal bars 688 of the upper cleaner carrier are pivotally secured to links or pitmans 738, of which one only is shown in the drawings, each link 738 being in turn pivotally connected to a crank 740 secured to a rock shaft 742 journaled in suitable brackets 744 (Figs. 1 and 3) secured to the upright 76 and to a longitudinally extending angle bar 746 (Fig. 5) that is secured at its opposite ends to the upright angle bar 624 and to a transverse angle bar 748. The angle bar 748 is in turn secured at its opposite ends to the side plates 488 and 490.

It will be evident that as the rock shaft 742 is oscillated, the upper cleaner carrier is oscillated along a path the major component of which is rectilinear, but which, like the rack 592, has a slight vertical component of motion.

The rack or screen 706 and its attached air and grain directing means 708 are releasably locked to or supported on the longitudinal bars 688 by plates or straps 750 pivoted as by bolts 752 to the outer ends of the bars 688 and have L-shaped depending inner end portions 754 receiving the outer transverse bar 704 of the rack-carrying frame. The straps 750 also have upwardly turned end portions 756 adapted to be lockingly engaged by thumb screws 758 threaded in the down-turned end portions of straps 760 secured to and projecting rearwardly from the bars 688. Upon release of the thumb screws 758 from the straps 750, these straps may be rotated so as to release the upper cleaner carrier which may thereafter be slid longitudinally of the machine along the ways or guides 702 to remove this carrier from the machine for cleaning purposes.

The upper cleaner carrier receives the grain and chaff and similarly small particles of other material from the feed screw 32 which comprises an auger 762 mounted on a shaft 764 journaled in brackets (not shown) secured to a convenient frame member as, for example, the diagonal frame member 108 (Fig. 5) or the upright 64 (Fig. 12) and to the longitudinal angle bar 718 (Fig. 3) which is secured at its rear end to the upright angle bar 624 of the cleaner housing and to the side plate 720 of this housing. The upper cleaner carrier also includes a hopper 766 secured to the frame member 704 or the rack or screen 706 and communicating through an opening in the side plate 632 (Fig. 1) with a chute 768 in communication with the elevator 36. Flexible strips 770 riveted to the side plates 632 and 720 overlap the longitudinal bars 688 to prevent grain from passing downwardly between the bars and the side plates.

The lower cleaner carrier 686 comprises a pair of longitudinal side rails 772 (Figs. 10 and 40 to 42) having at their forward ends upwardly extending portions 774 supporting a transverse panel 776 having a serrated upper surface to facilitate conveyance of the grain. Transverse bars 778 secured to the portion 774 of the side rails support transversely spaced longitudinally extending bars 780. The portion 774 of the side rails and the bars 780 are provided with longitudinally extended slots slidably receiving scalper screens 782 which are thus conveniently removable and replaceable by screens of different meshes as required for the efficient cleaning of different grains. The lower carrier cleaner is preferably mounted at its rear end by a resilient plywood panel or panels 784 secured to the rear transverse bar 778 and to a transverse bar 786 secured at its opposite ends to the side plates 632 and 720. At its forward end the lower carrier cleaner is mounted on the rock shaft 742 as by cranks 788 pivotally secured at their lower ends to brackets carried by the side rails 772. The saw-toothed panel 776 conveys the grain passing through the scalper screens to the feed screw 40 which comprises an auger 790, the shaft 792 of which is journaled in suitable brackets (not shown), secured to the longitudinal angle member 746 and to convenient members of the machine frame such as the diagonal bar 108 (Figs. 5 and 12) and the upright 64. At their rear ends the side rails 772 support a transverse panel 794 having a saw-toothed upper surface so as to convey grain or tailings received from the rear ends of the scalper screens back into the threshing cylinder through an opening formed by the plate-like hood portion 660 and the plate 576. A transversely extending plate 796 is carried by a rod journaled in the side plates 692 and 720 and projecting through one of said plates to provide a handle portion (not shown) for manual manipulation by which the plate 796 may be swung from the position shown in Fig. 10 to an oppositely inclined position in which the grain or tailings from the scalper screens 782 are directed between the side rails 772 and allowed to fall upon the rack 592 for re-screening by this rack. When the plate 796 is positioned as shown in Fig. 10, it serves to direct the tailings from the scalper screen 782 onto the conveying panel 794 by which the tailings are conveyed forwardly of the machine and returned to the threshing cylinder for re-threshing.

At its rear end the lower cleaner carrier is provided with an upstanding transverse plate 798 to which is secured a concave shield 800 which prevents the grain as it is discharged from the upper cleaner carried from being blown or projected out of the machine and directs the grain onto the scalper screens of the lower cleaner carrier.

The portion of the upper auger 762 which extends into the cleaner chamber is partially encased within a sheet metal shield 802 which extends only partially across the width of the cleaner chamber so that part of the grain may be projected laterally of the cleaner chamber onto a portion of the screen or rack 706 at its forward end, while another portion of the grain will be fed over the forward edge of the shield in a direction opposite to the direction of movement of the screen or rack. This distribution of the grain tends to feed the grain in a relatively even layer onto the rack or screen.

The portion of the lower auger 790 which extends across the cleaner chamber is partially encased within a sheet metal shield 804 secured to the side plates 632 and 720 and extending in front of and below the auger. The opposite edges of the shield 804 are secured to flexible strips 806 which in turn are secured to the lower surface of the conveying panel 776 and the forward transverse bar 778 to form seals at these points preventing the escape of the grain.

The outwardly projecting ends of the upper and lower augers 762 and 790 are housed within suitable tubular shields 808 secured to the side plate 632 and to the brackets which support the auger shafts 764 and 792.

The cleaner chamber is closed at its top by a hood 810 preferably formed of sheet metal and secured at its opposite edges to the longitudinal angle bar 718 and to the opposite upper angle bar 628. The rear portion of the hood 810 is inclined upwardly as at 812 and curved downwardly at its rear edge as at 814 to provide a shield or hood for directing the chaff separated from the grain by the fan or blower 714 out of the cleaner chamber at the rear end of the machine.

The cooperation of the various parts of the cleaner obtain a cleaning of the grain substantially more efficient than heretofore obtainable in a harvester-thresher combine. The honeycomb screen or rack 706, like the lower honeycomb rack 592, conveys straw and trash but not grain or berries, and the partitions of the screen do not catch straw or trash. The individual control of the several air streams by means of the adjustable valves 728 insures a smooth, substantially equal intensity flow of air through the longitudinally successive portions of the screen or rack, thereby preventing the grain from being thrown off of the screen with the chaff at some point where in prior machines the air blast was materially stronger than at some other point. Furthermore, the individual control of the several screens permits ready setting of the volume of air for the efficient cleaning of different kinds of grain.

Still further, this control of the air streams permits the elimination of the sieve of the usual cleaner. The presence of the scalper screens 782 permits the use of a screen 706 of fixed openings and one very unlikely to catch straw or stalks, for, while relatively small heavy particles may fall through the rack or the screen 706, they are entirely eliminated by the relatively fine mesh scalper screens 782. When such heavy particles falling upon the scalper screens are directed by the plate or valve 796 back into the rack 596 by which they are discharged from the machine or are returned to the threshing cylinder if in particular crops such heavy particles contain unthreshed grain.

The air control valves 728 are in operation adjustable so as to turn on enough air through the longitudinally successive portions of the screen 706 so as not quite to blow over any grain from the end of the upper carrier cleaner. This adjustment is entirely independent of the size of the mesh of the scalper screens, for this size of mesh is purely dependent upon the size of grain to be cleaned and the scalper screens may therefore be changed as required for different grains without effecting in any way the intensity of the air streams through the upper screen or sieve. In other works, after the proper scalper screen for the particular grain has been inserted, it is only necessary to adjust the air valves to get the proper distribution of air for separation of chaff from this particular grain.

By adjusting the different air valves individually, it is possible to individually vary the intensity of the air stream flowing through the first, second, third or fourth longitudinal sections of the part of the screen 706 through which the wind blows. The air valves enable the operator to cut the wind down to practically nothing on any or all sections on this part of the screen 706 and to control in a very accurate manner the air blast from front to back of this part of the screen. The rear end portion of the screen 706 has no air blowing up through it and what falls through this portion of the screen is caught by the hopper or trough 756 and returned into the elevator 36 which feeds the material to the cleaner. This return feed allows the operator to adjust the air valves so that very high intensity air streams may be employed to effect the most efficient cleaning of the grain and the grain which may therefore be blown beyond the last grain chute formed by the transverse partition 712 is received upon the rear portion of the screen above the trough 755. Through this portion of the screen the grain can readily settle since no air blows through this portion of the screen. The grain which settles through this portion of the screen into the trough may contain some trash or chaff which is returned by the elevator to the cleaner for recleaning. Therefore grains of a kind which are normally very difficult to clean unless a very strong stream of air is employed may be effectively cleaned in a relatively short cleaner without loss of grain.

The grain receiving tank

The grain receiving tank 34 is mounted upon the upper frame members 82, 100 and 104 of the auxiliary frame 96 and on auxiliary supports comprising an inclined angle bar 815 (Fig. 5) secured to the angle bar 108 and angle bars 816 and 817 secured at the upper end of the angle bar 813 and to the frame members 98 and 108. The tank may be of any convenient construction providing downwardly converging inner walls 818 (Fig. 4) and a bottom wall provided with a spring closed slide plate or valve 819 permitting the discharge of grain from the tank into a sack suspended from hooks (not shown) positioned around the slide plate, the sack being additionally supported on an adjustable stool or rest 820 (Fig. 1). The adjustable stool or rest 820 has a threaded mounting stud 821 received in a threaded bushing carried by a platform 822 secured at its opposite ends to the frame members 98, 102, 108 and 110 of the auxiliary frame 96.

The outer side 824 of the tank is provided with an opening 826 (Fig. 4) at its lower portion, which opening is normally closed by a plate 828 pivoted as at 830 to the lower wall of the tank. The opposite sides of the plate 828 are turned inwardly as at 832 to reenforce the plate and to provide sides which form with the plate a chute for unloading the tank. If desired, strips 834 of canvas or similar material may be secured to the sides 832 and to the rear wall 824 to prevent the grain from jumping the sides 832 as it gravitates down the plate 828 when in lowered position, while at the same time permitting the plate in its upper position to rest in compact relation to the side wall 824 of the tank.

The elevators

The elevator 36 comprises a continuous belt 852 (Figs. 37 and 38) of canvas or similar material having secured at longitudinally spaced points transversely extending angle bars 854 which form paddles for conveying the grain upwardly as the belt is driven. The belt passes about a lower drive roller 854, an upper roller 856, the lower roller being secured to a drive shaft 858 journaled in a suitable bracket (not shown) secured to and depending from the lower frame member 628 at the left hand side of the machine. The shaft 860 for the upper roller 856 passes through slots in the sides of the sheet metal housing 862 for the elevator and extends over the hood 810 of the cleaner. At one end the shaft 862 is journaled in a bearing 864 (Fig. 7) which is formed with a sleeve portion 866 mounted on a threaded rod 868 between adjusting and clamping nuts 870. The rod 868 is bolted at its lower end to the hood 810 or to the longitudinal angle bar 718 and is supported at its upper end by a bracing strap 872 held to the rod by the adjusting and clamping nuts 874 and bolted at its lower end to the hood 810 or the angle bar 718.

At its opposite end the shaft 862 is journaled in a bearing 876 (Fig. 6) supported in a yoke or ring 878 having a depending rod 880 guided in the outwardly turned flanges 882 of a bracket 884 secured to the outer side of the elevator housing 862. A coil spring 886, interposed between the lower flange 882 and a collar 888 secured to the rod 880 resiliently urges the rod, the yoke, the bearing and this end of the shaft upwardly to maintain the elevator belt 852 at an appropriate tension.

The paddles 854 are each cut away centrally of the belt so that a rib or bar 890 (Figs. 37 and 38) secured to the rear wall of the elevator housing 862 may project between the paddle sections to prevent the belt from swinging so as in turn to prevent the metal paddles from striking the housing which striking of the housing would cause an abnormal wear of the housing or of the paddles and set up unnecessary noises. The forward wall of the housing is provided intermediately with an opening 892 in communication with the chute 768 by which material is transferred from the hopper or trough 756 of the cleaner to the elevator 36 for reconveyance to the cleaner.

The elevator 36 receives the grain and chaff and similarly small particles from the feed screw 28. In order to facilitate transfer of this material from the feed screw to the elevator, the shaft of the feed screw adjacent its outer end is provided with a paddle 894 preferably having a serrated forward edge 896. The feed screw delivers the material axially of the shaft into a housing formed by a sheet metal plate 898 and the material in this housing is picked up by the paddle 894 and thrown onto the paddles 854 of the elevator through an opening 900 in the lower portion of the elevator housing. The serrated edge of the paddle permits it to pass articles or material which might otherwise tend to jam the paddle. The inner wall 902 of the elevator housing 862 is spaced from the inner sections of the paddles as shown in Fig. 38 to provide a gap through which material gathering on the inside of the belt may be diverted off to the side of the belt between the inner sections of the paddles and the wall 902 and may fall downwardly onto a diverting block or blocks 904 and may be directed into the path of the paddles to be picked up thereby.

The forward flight of the elevator belt is supported upon or guided by a rail or platform 906 secured to the elevator housing as by bolts 908 adjustably received in slotted blocks 910 and similarly slotted portions in the inner and outer walls of the elevator housing.

The transfer of the material from the auger or feed screw 28 to the belt elevator by means of the paddle 894 has a number of advantages over prior arrangements in which the lower pulley roller was mounted on the feed screw shaft, the principal advantage of which is that there is little tendency for the material to get or collect under the belt as it does in such prior arrangements. The material is discharged or thrown from the top of the elevator into the tubular housing for the feed screw 32 which feeds the material into the cleaner. The cleaned grain is fed from the cleaner by the feed screw 40 to the elevator 38. This elevator 38 comprises an endless belt 912 (Figs. 1 and 39) which passes over a lower drive roller 914, mounted on the outer end of the shaft 792 of the feed screw, and over the upper idler roller 916. The continuous belt 912 is provided with longitudinally spaced pairs of grain receiving cups 918, the cups of each pair being spaced transversely of the belt and moving upwardly and downwardly on opposite sides of bars 920 secured to the side walls of the elevator housing 922 to provide ribs which prevent swinging of the belt and buckets thereby to prevent the buckets from scraping on the housing and setting up unnecessary noises and wearing contacts between the buckets and the paddle. The upwardly moving flight of the elevator belt is supported upon or guided by a rail or platform 924 carried by bars 926 having slots in their inturned ends, which slots receive mounting bolts 928 carried by the side walls of the elevator housing and spacer blocks 930. The elevator 38 discharges the grain into a duct 932 which extends from and may be formed integrally with the elevator housing 922 over the top of the tank and projects downwardly thereinto. Within the tank the duct is provided at its lower end with an inclined discharge spout 934 (Fig. 4) directed toward the rear inclined wall 818 so that the grain, particularly beans, will not be thrown or bounced out of the grain tank when the elevator 38 is driven at high speeds.

*The drive mechanisms and connections*

The sickle drive mechanism 44 comprises a collar 936 (Figs. 18 and 19) mounted on the outwardly extending end of the drive shaft 558 of the feeder 24, which shaft is connected to the main driving shaft 178 by a flexible coupling 938 which may be of any desired conventional construction. The collar 936 is provided with a peripheral, cylindrical surface 940 whose axis is inclined to the axis of the shaft 558. A ball bearing 942 is mounted on the cylindrical inclined or "eccentric" surface 940 of the collar 936 and is secured in a split annular clamp or yoke 944. The yoke or clamp 944 is provided with diametrically opposed radially projecting circular ears or arms 946 on which is journaled as by bearing block or caps 947, carried by U-bolts 948, a yoke 950 which supports the rear end of a shaft or rod 952. As the shaft 558 rotates, the bearing 936 which is secured to the shaft causes the roller bearing 942 and the yoke 944 to oscillate or wobble about an axis which is coincident with the axis of the shaft 952.

A generally U-shaped yoke 954 is frictionally clamped to the lower end of the shaft or rod 952 as by bolts 956 passing through adjacent radial flanges 958 of a reduced, split cylindrical portion 960 of the yoke 954. The forward enlarged portion of the yoke 954 is formed with diametrically opposed lugs 962 pivotally received in the upper ends of links 964 (Figs. 18 and 20) secured at their lower ends to a rod 966. The rod 966 is journaled in a boss 968 formed adjacent the lower end of a lever 970 secured at its upper end as by screws 972 to a cup-shaped mounting member 974. The cup-shaped mounting member 974 is journaled on a pin or stud bolt 976 and on an anti-friction bearing 978 mounted on the stud bolt. The bearing retaining ring 980 is secured to the rim of the cup-shaped mounting member 974 and overlaps the bearing to retain the same in said member. The stud bolt 976 is carried by and fastened to a bracket 982 which comprises an upstanding bar or strap 984 bolted at its lower end to a generally V-shaped reenforcing bar or strap 986 having its lower end turned rearwardly and fastened to a plate 988 secured to and extending between the angle bars 254 at the left hand side of the machine. The bar or strap 986 is in turn reenforced by a bar or strap 990 welded thereto, extending rearwardly therefrom, and welded to the plate 988 adjacent its rear edge.

The lever 970 is pivoted at its lower end as by a stud bolt 992 to a link 994 in turn pivotally connected as by stud 996 to a bracket 998 bolted to the end of the reciprocating sickle bar 246.

As the yoke 944 oscillates or wobbles about an axis coincident with the axis of the shaft 952, the shaft 952 is oscillated, and this oscillation of the shaft is transmitted to the lever 970 through the frictional coupling between the shaft 952 and the yoke 954, the links 964 and the rod 966. The oscillation of the lever 970 causes reciprocation of the sickle bar 246 as will be evident. Any component of motion longitudinally of the shaft 952 which is imparted thereto by the wobbling yoke 944 causes the links 964 and the rod 966 to pivot about the axis of the boss 968, but this pivoting of the links and the rod is not transmitted to the lever 970 which is constrained to move about the axis of the stud bolt 976, the axis of this bolt being substantially coincident with the axis of the shaft 952. The pivoted link connection between the shaft 952 and the lever 970 also permits relative movement between the shaft 952 and the lever as the header is raised and lowered. Thus this mechanism provides a positive driving connection, including an overload release, between the main drive shaft and a reciprocating sickle bar which is carried by a header that may be raised and lowered relative to the main driving shaft. The annular member or collar 936 provides a very simple and convenient means of mounting the wobble bearing and yoke on the main drive shaft 558.

The flexible coupling between the shaft 558 and the power shaft 178 permits relative movement of these shafts while maintaining the driving connection and the slip coupling between the shaft 952 and the yoke 954 prevents the breaking of the sickle under severe loads by permitting the driven mechanism and the sickle to remain stationary under a severe load while the shaft 952 continues to operate.

The driving connections 46 for the reel feed comprise the pulley 1000 (Fig. 1) secured to the outer projecting end of the upper shaft 556 (Figs. 3, 27 and 28) of the feeder 24. A continuous, preferably V, belt 1002 (Fig. 1) passes about the pulley 1000 and about the driving rim 368 of the reel feed 16, the rim 368 preferably having an annular peripheral groove receiving the V-belt, the groove in the rim 368 having a flat bottom in cross section. A spring pressed idler roller 1004 carried by a lever 1006 pinned to the side plate 218 of the header maintains the belt under the proper operating tension.

It will be evident that the pulley and belt driving connections for the reel feed are in essence a friction drive mechanism which permits the reel drive belt to slip on the flat bottom of the groove in the rim 368 when crops are encountered which are too tough to be raked in over the sickle by the reel until they have been cut off by the sickle.

The change speed driving connections 48 for the threshing mechanism comprise a sheave 1008 (Figs. 3 and 30), a similar sheave 1010 of smaller diameter and a V-belt 1012 connecting the sheaves. The sheave 1008 is mounted on the lower shaft 558 of the feeder 24 and comprises an inner disc 1014 having a hub portion 1016 receiving the shaft 558, an annular portion 1018 connected to the hub 1016 by the radially extending arms 1020. The face portion 1022 of the disc 1014 about the annular portion 1018 is substantially perpendicular to the axis of the shaft while the annular outer face portion 1024 of the disc extends at an angle to the axis of the shaft and the face portion 1022. A disc 1026, which may be formed of sheet metal is riveted to the disc 1014 in overlying relation to the face portions 1014 and 1022 and constitutes in effect an extension of the inclined annular face portion 1024. The annular portion 1018 of the disc 1014 is provided with forwardly projecting angularly spaced lugs or portions 1028 constituting angularly spaced extensions of the ring 1018. The ring 1018 and the lugs 1028 are externally threaded to receive the internally threaded disc 1030. The disc 1030 is provided with face portions 1032 and 1034 similar to the face portions 1022 and 1024 of the disc 1014 and a disc 1036 similar to the disc 1026 is riveted to the inner face of this disc 1030. The discs 1026 and 1036 form a V-groove 1038 to receive the V-belt 1012 and the width of this groove may be varied to permit the V-belt to ride closer to or farther from the axis of the sheave, thereby to vary the speed at which the belt is driven by the sheave by rotating the outer disc 1030 on the threaded ring 1018 to position this disc closer to or further from the disc 1014. The disc 1030 is normally pinned to the disc 1014 against angular movement relative thereto by one or more studs or bolts 1040 receivable in axially directed openings in the face portions 1022 and 1032. A clamping nut or ring 1042 threaded on the ring 1018 further secures the discs in adjusted position. The clamping ring or nut 1042 is preferably provided with angularly spaced, radially projecting arms or lugs 1044 to facilitate manual rotation thereof to clamp or release the discs.

The disc 1030 is additionally provided with angularly spaced, forwardly projecting portions 1046 forming pockets 1048 to receive an operating bar by which the disc 1030 may be manually rotated on the ring 1018.

The sheave 1010 is similar in construction to the sheave 1022 so that the corresponding discs may be axially adjusted relative to each other to vary the speed at which the threshing cylinder shaft 496 is driven by the belt 1012. It should also be observed that the sheaves 1008 and 1010 are readily interchangeable to still further vary the speed at which the threashing cylinder is rotated by the main drive shaft 558.

The driving connections 50 for the rack or conveyor and separator 26 comprise a pitman 1050 (Fig. 1) pivotally connected at its forward end to a pin carried by the outer face of the pulley 1000 and pivotally connected at its rear end to a crank 1052 secured to the outer projecting end of the rock shaft 606.

The driving connections 52 for the upper and lower carriers 684 and 686 of the cleaner 30 comprise cranks 1054 and 1056 secured to the rock shafts 606 and 742 respectively and interconnected by a link 1058 pivotally connected at its opposite ends to said cranks. The driving connections 54 for the fan or blower 714 of the cleaner 30 comprise V-grooved pulleys 1060 (Fig. 19) and 1062 (Fig. 1), secured to the drive shaft 558 and the fan shaft 716 respectively, V-belt 1064 passing about the pulleys 1060 and 1062 and an intermediate guide pulley 1066 (Fig. 1) journaled on a stud shaft mounted in any convenient manner on the side plate 490.

The driving connections 56 for the feed screws 32 and 40 comprises a V-grooved driving pulley 1068 (Fig. 3) secured to the right end of the fan shaft 716 and driven pulleys 1070, 1072 and 1074 secured to the outer ends of the shaft 764 of the feed screw 32, a shaft 860 of the elevator 36 and the shaft 792 of the feed screw 40 and the elevator 38. A V-belt 1076 passes about the pulleys 1068 to 1074 and over a tension pulley or roller 1078 carried by a spring-pressed lever 1080 pivoted to the bracket 744 at the right-hand side of the machine.

A driving connection 58 for the feed screw 28 comprises a V-grooved driven pulley 1082 (Fig. 1) secured to the outer end of the shaft 858 of the elevator 36 and a V-grooved driven pulley 1084 secured to the outer end of the shaft of the feed screw 28, a V-belt 1086 passing about the driven pulleys 1082 and 1084.

Operation of the machine

The operation of the machine will be evident from the foregoing description of the construction of the several parts. However, it may be briefly stated that the harvester-thresher combine having its draft and power connections 6 and 8 connected to the tractor 10, not shown, the power actuated frictionally driven reel feed 16 will grasp and move the crop directly in front of the combine and the crop divided and directed thereinto by the "Y-dividers" 18 along the header 12 and across the sickle 14 by which the crop is cut. The cut crop is carried along the header 12 by the reel fingers 376, the reel bats 328, and in some cases by the reel bat extensions 430, until the crop is brought to the lower part of the feeder 24, the ribs 426 and 428 along the side walls of the header keeping the crop down near the bottom of the header and the feeder 24, the plates 586 and 598 preventing the crop from being carried over the reel as it swings upwardly from the feeder. As the fingers of the reel pass upwardly in front of the feeder 24, they are swung downwardly to release the crop which is engaged by the prongs 370 and 372 of the feeder and the face of the feeder belt and is pushed by the feeder into the threshing cylinder 484 of the threshing mechanism 22. The swinging threshing bars 506 in cooperation with the continuous zig-zag concave bars 548 thresh the berries or grain from the crop stalks and push or project the stalks or straw and the threshed berries or grain upwardly through the outlet opening 662 of the threshing mechanism into the rack or conveyor and separator 26. The stalks or straw and the grain or berries are directed downwardly onto the carrier 636 and the rack 592 by the downwardly turned wall section 664 and the adjustably inclined plate 668 and curtain 670, the curtain 670 preventing the material from passing too rapidly through the conveyor and separator to effect an efficient separation and preventing the grain or berries from being projected therethrough at such a high speed as to be carried out of the rear end of the machine.

The rack 592 conveys the stalks or straws rearwardly while permitting the grain and chaff to separate downwardly onto the carrier 642 by which the grain and chaff are carried to the feed screw 28. The stalks or straw discharged from the rear end of the rack 592 is directed downwardly by the hood portion 672 so as to be deposited in a neat layer on the ground. The feed screw 28 carries the grain or berries and chaff and similarly small particles such as small sticks, etc., to the left hand side of the combine and the paddle 894 throws or projects such material onto the elevator paddles 854 by which it is carried upwardly and discharged into the feed screw 32.

The feed screw 32 distributes the material in a relatively uniform layer upon the rack 706 of the upper cleaner carrier 684. As the material is carried rearwardly by the upper cleaner carrier, the individually adjusted streams or blasts of air through the different sections of the rack 706, blow the chaff and other light particles upwardly while allowing the grain and heavy particles to separate downwardly through the rack and through the chutes formed by the transverse partitions 712 onto the plates 734 and 736, the chaff or the light particles being directed by the portions 812 and 814 of the hood 810 out of the rear end of the machine. As the upper carrier cleaner moves relatively rapidly back and forth with a considerable component of motion in a vertical direction, the grain and any heavy foreign particles are deposited on the scalper screens 782 which are of such small size mesh that only grain may pass therethrough, and heavy foreign particles which may include unthreshed grain or berries are deposited onto the plate 796 by which they are selectively returned either to the threshing cylinder for rethreshing or to the rack or conveyor and separator 26 for re-separating and re-feeding to the cleaner. The grain passing through the scalper screens 782 falls upon the carrier or conveyor plate 776 by which it is carried to the feed screw 40 and by this feed screw carried to and discharged in the buckets of the elevator 38. From the elevator the grain is discharged into the duct 932 by which it is directed to the spout 934 and is discharged therethrough into the tank 34. The spout 934 being directed downwardly toward the inclined rear wall 818 of the tank, prevents the grain from bouncing out of the tank even though the elevator 38 be driven at a very high speed.

When it is desired to sack the grain while the combine is being moved through the field, the auxiliary sacking platform 42 is affixed to the auxiliary tank supporting frame portion 96 so that an operator on this platform may readily sack the grain and by placing the filled sack on the inclined plate 850, allow the sack to gravitate to the ground. When it is desired to empty the tank into a truck or vehicle, the plate 828 may be swung downwardly about its pivot 830 to form a gravity chute permitting the grain to gravitate through the openings 826 in the upper side wall of the tank along the chute and into the truck or other vehicle positioned in proximity to the combine. The plate 828 may be maintained in its normal vertical position closing the tank opening 826 by any suitable and convenient means such as a latch, a counterweight, etc., not shown.

The modified feeder

As shown in Figs. 44 and 47, in the feeder 24' the driving shaft 1088, which corresponds to the driving shaft 558 of the feeder 24, is similarly mounted in the side brackets 1089 and similarly connected to the power shaft 178. A shaft 1090, which corresponds to the shaft 556 of the feeder 24 is mounted forwardly of the shaft 1088. The shaft 1088 has secured to its opposite ends sprockets 1092 and the shaft 1090 is similarly provided at its opposite ends with sprockets 1094. Endless chains 1096 are carried by the sprockets 1092 and 1094. Spaced transverse bars 1098 corresponding to the bars 566 of the feeder 24 are connected at their opposite ends to the opposed chains 1096 in any convenient manner as for example, by suitable small brackets fastened to certain link connecting pins of the chains. If desired, sprockets 1100 and 1102 may be secured to intermediate portions of the shafts 1088 and 1090 and interconnected by an endless chain 1104, the bars 1098 each being in two sections, of which each section is connected at its opposite ends to the chain 1104 and to one of the chains 1096. Each bar 1098 carries a plurality of spaced relatively elongated metal fingers or prongs 1106 corresponding to the prongs 572 of the feeder 24 and shorter metal fingers or prongs 1108 may, if desired, be secured to each bar in alternating relation with the prongs 1106, the prongs 1108 corresponding to the prongs 572 of the feeder 24. The prongs 1106 extend at right angles to their carrying bars in a direction opposite to the direction of movement of the feeder chains so that as they move rearwardly of the header between the shafts 1088 and 1090, they extend parallel to the bottom of the header and project from the chains as they revolve around the axes of the shafts. As the prongs 1106 swing about the axis of the shaft 1088 at the rear end of the header, they feed or push the crop into the threshing mechanism 22. As these same prongs 1106 revolve around the axis of the shaft 1090, they engage the crop being fed along the header by the reel feed 16; assist in transferring the crop from the header to the feeder and push the crop downwardly so as to be carried rearwardly of the header between the bottom of the header and the lower flight or flights of the chains 1096 and 1104. The fingers or prongs 1108 extend from their associated bars in a direction opposite to the direction of movement of the chains and outwardly from the bars to assist the bars in moving the crop from the reel along the bottom of the header and into the threshing mechanism 22. The prongs 1102 also by reason of their angulation apply to the crop as it is being moved rearwardly of the header by the feeder downward forces tending to hold the crop in the bottom of the header and prevent upward projection of the crop.

If desired, suitable sheet metal shields 1110 may extend between and around the shafts 1088 and 1090 between the several chains to offer further protection against crops passing upwardly through the feeder.

The forward end of the feeder is provided with a floating mounting on the header 12 to permit yielding movements of the feeder as heavy, tough crops pass between the feeder and the bottom of the header. This floating mounting may be provided for example by mounting members 1112 at opposite ends of the shaft 1090, the shaft 1090 extending through slots 1114 in the side plates 220 and 222 of the header. Suitable slot closing plates, not shown, may be carried by the shaft 1090. Each member 1112 comprises a stud having an enlarged head 1116 in which the shaft is journaled, a reduced shank portion 1118 and a further reduced shank portion 1120 forming shoulders 1122 and 1124. The reduced portion 1120 of the mounting member extends through an enlarged opening (see Fig. 47) in the flange of a transverse angle bar 1126 fastened to the lower longitudinal frame members 210 and 212 of the header. A counterbalancing or partially counterbalancing spring 1128 may encircle the shank portion 1118 of the mounting member and be interposed between the shoulder 1122 and the angle bar 1126. The weight of the forward end of the feeder and/or a coil spring 1130 encircling the shank portion 1120 of the mounting member may be utilized normally to hold the forward end of the feeder in a desired spaced relation to the bottom of the header, in which normal position the shoulder 1124 engages the angle bar 1126 as shown in Fig. 47. The shoulder 1124 may be of convex facial configuration to facilitate tilting the mounting member 1112 relative to the angle bar 1126, or a suitable convex washer or wear plate may be secured to the mounting member to form the shoulder 1124. The spring 1130 is interposed between the angle bar 1126 and an adjusting nut 1132 threaded on the lower end of the shank portion 1120.

Links or bars 1134, each journaled at opposite ends on the shafts 1088 and 1090, constrain the shaft 1090 to movement about the axis of the shaft 1088 so that the chains are kept tight as the forward end of the feeder moves upwardly or downwardly relative to the rear end of the feeder due either to a yielding movement of the forward end of the feeder under a heavy load or crop between the feeder and the bottom of the header, or due to the raising and lowering of the header. It will be evident that the feeder may be mounted at any desired angle to the bottom of the header between the parallel position shown in Fig. 4 and the generally vertical inclined position shown in Fig. 10, and the forward end of the feeder provided with a floating mounting as shown in Figs. 44 and 47. It will also be evident that the feeder may be mounted at different desired distances from the bottom of the header while generally parallel thereto, the sets of prongs 1106 and/or 1108 being greater or less in length depending upon the distance between the feeder and the bottom of the header.

It will be evident from the foregoing description that applicant has provided an improved harvesting-threshing machine which is of more inexpensive construction, yet compact and rigid in character and capable of efficiently handling, with a minimum of adjustment or replacement of elements, substantially all manner of crops in various conditions of growth and which is of considerably less weight than prior harvesting-threshing machines.

Applicant has further provided a harvesting-threshing machine or combine of the type powered by a tractor or similar power-supplying draft vehicle and wherein the combine is provided with wheel mountings and with draft and power connections permitting the combine to be alined rearwardly of the tractor for road transport and in different lateral positions out of alinement with the tractor and permitting the body of the combine to be disposed at various angles relative to its path of movement for the most efficient harvesting of crops of the various kinds and in various conditions.

Applicant has further provided in a harvesting-threshing machine or combine a light and yet rigid frame structure, providing at the same time relatively wide chambers for the threshing and separating mechanisms and supporting a rigid frame structure of maximum width consistent with the provision of a machine within the legal width limits for road transport.

The invention has further provided positive driving means between the main drive shaft carried on the main frame of the combine and the sickle mechanism carried at the forward end of a header swingably mounted on the main frame, and which driving connection is simple and efficient and includes means permitting the swinging of the header relative to the fixed drive shaft.

The invention also has provided a simplified header construction having means for feeding the crop along the bottom, relatively non-shiftable wall of the header, and wherein the header is provided with forwardly projecting, outwardly flaring dividers for gathering in the crops which would otherwise be crushed by the machine as it travels through the field of crops.

This invention further provides a simplified header lift mechanism, including means which may extend forwardly of the machine for manipulation by an operator on the tractor or other draft vehicle.

Applicant's invention has further provided a harvesting-threshing machine providing a crop-gathering header and means for so feeding the crops along the header by means of a reel adjacent the forward end of the header, that the usual canvas belt or conveyor extending along the header may be eliminated.

The invention has further provided a header construction having ground-engaging means forming a floating support for the header so that the header will automatically be raised and lowered in accordance with the contour of the ground.

The invention has also provided a simplified and efficient threshing mechanism having a large cracking-threshing ratio, so that the mechanism may be operated at a large range of speeds for the most efficient threshing of all kinds of crops, and has provided a threshing mechanism with a "concave" which requires no adjustment relative to the threshing mechanism, in order to efficiently handle all kinds of crops and which "concave" is of such construction as to eliminate cracking of the grain heretofore caused by the bouncing of the crushed grain back from the walls or bars of the "concave."

The invention has also provided a threshing mechanism including a threshing cylinder of an inherently rigid character, eliminating the need for dynamic balancing means and providing threshing elements yieldable relative to the cylinder to prevent the jamming thereof by stones or other unyielding foreign matter which may be fed into the threshing mechanism.

The invention has further provided a harvesting-threshing combine, including a separating mechanism which will convey the straw while not conveying the grain and without catching the straw in the screen which separates the straw from the grain; it has provided a cleaner capable of efficiently handling all kinds of crops with a minimum amount of adjustment or replacement of parts and in which means is provided for directing individually controllable streams of air through longitudinal successive portions of a cleaner screen so the different kinds of grains may be efficiently separated from the chaff without blowing any of the grain out of the cleaner with the chaff and whereby the air streams through longitudinal successive portions of the cleaning screen will remain substantially equal whereby to eliminate eddies which tend to cause the grain to be carried out of the cleaner with the chaff; it has also provided a cleaner having simplified and readily operable means for selectively returning uncrushed grain from the cleaner to the threshing mechanism or returning the insufficiently cleaned grain to the separating mechanism for separation and to the cleaner for recleaning; it has provided a conveniently located grain tank from which the grain may be discharged by gravity for sacking or for gravity discharge into a freight vehicle; it has further provided in a harvesting-threshing machine an elevated grain tank, carried by a supporting frame with which a simple auxiliary sacking platform may detachably be associated whereby the grain in the tank may be sacked while in operation with the harvesting and threshing of the crop.

Having thus described my invention, what I claim as new and desire to secure by Letters Patent is:

1. In a harvesting-threshing machine, a frame, a threshing mechanism carried by the frame, a harvesting mechanism carried by the frame forwardly of said threshing mechanism, said harvesting mechanism comprising a header having opposed side walls and a bottom wall non-shiftable in the direction of crop movement, said bottom wall extending upwardly and rearwardly to said threshing mechanism, means carried by the header in advance of the bottom wall thereof for severing the crop, and crop-feeding means carried by the header including swinging bars engaging the crop adjacent the forward end of the header and carrying it rearwardly upwardly and along said bottom wall and in contact therewith to said threshing mechanism.

2. In a harvesting-threshing machine, a frame, a threshing mechanism carried by the frame, a harvesting mechanism carried by the frame forwardly of said threshing mechanism, said harvesting mechanism comprising a header having opposed side walls and a bottom wall non-shiftable in the direction of crop movement, said wall extending continuously and rearwardly to said threshing mechanism, means carried by the header in advance of the bottom wall thereof for severing the crop, crop-feeding means carried by the header including swinging bars engaging the crop adjacent the forward end of the header and carrying it rearwardly and upwardly along said bottom wall and in contact therewith, and means engaging the crop adjacent the rear end of the header and feeding it into the threshing mechanism along said last-named wall.

3. In a harvesting-threshing machine, a frame, a threshing mechanism carried by the frame, a harvesting mechanism carried by the frame forwardly of said threshing mechanism, said harvesting mechanism comprising a header having opposed side walls and a bottom wall non-shiftable in the direction of crop movement, said wall extending upwardly and rearwardly to said threshing mechanism, means carried by the header in advance of the bottom wall thereof for severing the crop, and crop-feeding means carried by the header including a rotary reel having a series of angularly spaced bars extending transversely of the header and engaging the crop at the forward end of the header and carrying it rearwardly and upwardly along said bottom wall.

4. In a harvesting-threshing machine, a frame, a threshing mechanism carried by the frame, a harvesting mechanism carried by the frame forwardly of said threshing mechanism, said harvesting mechanism comprising a header having opposed side walls and a bottom wall non-shiftable in the direction of crop movement, means carried by the header in advance of the bottom wall thereof for severing the crop, crop-feeding means carried by the header including a rotary reel having opposed sets of radial arms and a series of angularly spaced bars extending transversely of the header and pivoted to the opposed sets of radial arms for swinging movement opposite to the direction of rotation of said reel, said bars upon rotation of the reel engaging the crop adjacent the forward end of the header and carrying it rearwardly along said bottom wall, means adjacent the rearward end of the header for feeding the crop from the header into the threshing mechanism, said last-named means engaging the crop from above, and means for swinging said bars relative to the radial arms in a direction opposite to the direction of rotation of the reel to release the crop to the feeding means adjacent the rearward end of the header.

5. In a harvesting-threshing machine, a frame, a threshing mechanism carried by the frame, a harvesting mechanism carried by the frame forwardly of said threshing mechanism, said harvesting mechanism comprising a header having opposed side walls and a bottom wall non-shiftable in the direction of crop movement, said bottom wall extending upwardly and rearwardly to said threshing mechanism and constituting a support along which said crop is moved into said threshing mechanism, means carried by the header in advance of the bottom wall thereof for severing the crop, crop-feeding means carried by the header including swinging bars engaging the crop adjacent the forward end of the header and carrying it rearwardly along said bottom wall, and yieldable fingers carried by the bars in laterally spaced relation and extending radially of the axis of swing of the bars for raking the crop into the header and along the bottom wall of the header and yieldable relative to the bars to prevent jamming of the bars by the crop.

6. In a harvesting-threshing machine, a frame, a threshing mechanism carried by the frame, a harvesting mechanism carried by the frame forwardly of said threshing mechanism, said harvesting mechanism comprising a header having opposed side walls and a bottom wall non-shiftable in the direction of crop movement, said bottom wall extending to said threshing mechanism, means carried by the header in advance of the bottom wall thereof for severing the crop, crop-feeding means carried by the header including a rotary reel having a series of angularly spaced bars extending transversely of the header and engaging the crop at the forward end of the header and carrying it rearwardly along said bottom wall to said threshing mechanism, and yieldable fingers carried by the bars in laterally spaced relation and extending radially of the axis of swing of the bars for raking the crop into the header and along the bottom wall of the header and yieldable relative to the bars to prevent jamming of the bars by the crop.

7. In a harvesting-threshing machine, a frame, a threshing mechanism carried by the frame, a harvesting mechanism carried by the frame forwardly of said threshing mechanism, said harvesting mechanism including a header having opposed side walls and a bottom wall non-shiftable in the direction of crop movement for conducting the crop directly to said threshing mechanism, means at the forward end of the bottom wall for cutting the crop, means carried by the header and engaging the crop adjacent the forward end of the header and carrying it rearwardly along said bottom wall, a feeder adjacent the rear end of the header for carrying the crop from the header into the threshing mechanism, said feeder comprising a plurality of spaced conveying bars extending substantially between said opposed side walls of the header, and means for moving said bars in succession in the direction of crop movement along the header to carry the crop into the threshing mechanism.

8. In a harvesting-threshing machine, a frame, a threshing mechanism carried by the frame, a harvesting mechanism carried by the frame forwardly of said threshing mechanism, said harvesting mechanism including a header having opposed side walls and a bottom wall non-shiftable in the direction of crop movement, said bottom wall conducting the crop to said threshing mechanism, means at the forward end of the bottom wall for cutting the crop, means carried by the header and engaging the crop adjacent the forward end of the header and carrying it rearwardly along said bottom wall, a feeder adjacent the rear end of the header and cooperating with said bottom wall for carrying the crop from the header into the threshing mechanism, said feeder comprising a continuous conveyor carrying a plurality of spaced transverse bars extending substantially between said opposed side walls of the header along a path first vertically downward toward the bottom wall of the header to hold the crop in the bottom part of the header and then generally in the direction of crop movement along the header to carry it into the threshing mechanism and prongs projecting from said transverse bars to rake the crop into the threshing mechanism.

9. In a harvesting-threshing machine, a frame, a threshing mechanism carried by the frame, a harvesting mechanism carried by the frame forwardly of said threshing mechanism, said harvesting mechanism including a header having opposed side walls and a bottom wall non-shiftable in the direction of crop movement, said bottom wall forming a continuous supporting incline for conducting the crop into said threshing mechanism, means at the forward end of the bottom wall for cutting the crop, means carried by the header and engaging the crop adjacent the forward end of the header and carrying it rearwardly along said bottom wall, a feeder adjacent the rear end of the header and spaced above said bottom wall for carrying the crop from the header into the threshing mechanism, said feeder comprising a continuous conveyor carrying a plurality of spaced transverse bars extending substantially between said opposed side walls of the header along a path first vertically downward toward the bottom wall of the header to hold the crop in the bottom part of the header and then generally in the direction of crop movement along the header to carry it into the threshing mechanism, and sets of prongs carried by each bar, the prongs of each set being interposed between the prongs of each other set at different angles relative to the prongs of each other set for raking the crop into the threshing mechanism.

10. In a harvesting-threshing machine, a frame, a threshing mechanism carried by the frame, a harvesting mechanism carried by the frame forwardly of said threshing mechanism, said harvesting mechanism comprising a header having opposed side walls and a bottom wall non-shiftable in the direction of crop movement for conducting the crop directly to the threshing mechanism, means carried by the header in advance of the bottom wall thereof for severing the crop, crop feeding means carried by the header and engaging the crop adjacent the forward end of the header to carry it rearwardly along said bottom wall and deliver the same to said threshing mechanism, and means receiving the crop from the first-mentioned crop feeding means for feeding the crop into the threshing mechanism.

11. In a harvesting-threshing machine, a frame, a threshing mechanism carried by the frame, a harvesting mechanism carried by the frame forwardly of said threshing mechanism, said harvesting mechanism including a header having opposed side walls and a bottom wall non-shiftable in the direction of crop movement and extending to said threshing mechanism, means at the forward end of the bottom wall for cutting the crop, means carried by the header and engaging the crop adjacent the forward end of the header to carry it rearwardly along said bottom wall, and a feeder adjacent the rear end of the header for carrying the crop along said bottom wall and in contact therewith from the header into the threshing mechanism, said feeder comprising a plurality of spaced bars extending substantially between said opposed side walls of the header and each bar carrying projecting crop engaging and conveying prongs, and means for moving said bars in succession in the direction of crop movement along the header to carry the crop into the threshing mechanism.

12. In a harvesting-threshing machine, a frame, a threshing mechanism carried by the frame, a harvesting mechanism carried by the frame forwardly of said threshing mechanism, said harvesting mechanism including a header having opposed side walls and a bottom wall non-shiftable in the direction of crop movement for conducting the crop to said threshing mechanism, means at the forward end of the bottom wall for cutting the crop, means carried by the header and engaging the crop adjacent the forward end of the header to carry it rearwardly along said bottom wall and in contact therewith, and a feeder adjacent the rear end of the header for carrying the crop from the header into the threshing mechanism, said feeder comprising a plurality of spaced bars extending substantially between said opposed side walls of the header, a continuous conveying element carrying said bars in succession in the direction of crop movement along the header to carry the crop into the threshing mechanism, mounting and driving shafts for said continuous conveying element spaced longitudinally of the header, and means for yieldably mounting the forward one of said shafts relative to the bottom wall of the header.

13. In a harvesting-threshing machine, a frame, a threshing mechanism carried by the frame, a harvesting mechanism carried by the frame forwardly of said threshing mechanism, said harvesting mechanism including a header having opposed side walls and a bottom wall non-shiftable in the direction of crop movement and extending continuously to said threshing mechanism, means at the forward end of the bottom wall for cutting the crop, means carried by the header and engaging the crop adjacent the forward end of the header and carrying it rearwardly along said bottom wall and in contact therewith, a feeder adjacent the rear end of the header for carrying the crop from the header into the threshing mechanism, said feeder comprising a plurality of spaced conveying bars extending substantially between said opposed side walls of the header, and continuous conveyor means inclined to the bottom wall of the header to which said bars are secured and by which said bars are moved in succession to carry the crop into the threshing mechanism.

14. In a harvesting-threshing machine, a frame, a threshing mechanism carried by the frame, a harvesting mechanism carried by the frame forwardly of said threshing mechanism, said harvesting mechanism including a header having opposed side walls and a bottom wall non-shiftable in the direction of crop movement for conducting the crop to said threshing mechanism, means at the forward end of the bottom wall for cutting the crop, means carried by the header and engaging the crop adjacent the forward end of the header and carrying it rearwardly along said bottom wall, a feeder adjacent the rear end of the header for carrying the crop from the header into the threshing mechanism, said feeder comprising a plurality of spaced conveying bars extending substantially between said opposed side walls of the header, continuous conveyor chains of which a flight of each chain extends substantially parallel to the bottom wall of the header, means for securing said bars to said chains, and mounting and driving means for said chains.

15. In a harvesting-threshing machine, a frame, a threshing mechanism carried by the frame, a harvesting mechanism carried by the frame forwardly of said threshing mechanism, said harvesting mechanism comprising a header having opposed side walls and a bottom wall non-shiftable in the direction of crop movement, means carried by the header in advance of the bottom wall thereof for severing the crop, crop-feeding means carried by the header including swinging bars engaging the crop adjacent the forward end of the header and carrying it rearwardly along said bottom wall up to the threshing mechanism, and means engaging the crop from above adjacent the rear end of the header and feeding it into the threshing mechanism, each of said bars having a plurality of spaced flexible tines extending radially with respect to the path of swing of the bars, the free ends of the tines being inclined oppositely to the direction of crop movement along the bottom wall to release the crop radially to the crop feeding means adjacent the rear end of the header.

WALTER R. DRAY.

CERTIFICATE OF CORRECTION.

Patent No. 2,352,257. June 27, 1944.

WALTER R. DRAY.

It is hereby certified that error appears in the printed specification of the above numbered patent requiring correction as follows: Page 17, first column, line 31-32, claim 1, for "rearwardly upwardly and" read --upwardly and rearwardly--; line 67-68, claim 3, after "bottom wall" and before the period insert --to said threshing mechanism--; and that the said Letters Patent should be read with this correction therein that the same may conform to the record of the case in the Patent Office.

Signed and sealed this 29th day of August, A. D. 1944.

Leslie Frazer (Seal)                    Acting Commissioner of Patents.